United States Patent
Bordow

(10) Patent No.: US 11,748,469 B1
(45) Date of Patent: *Sep. 5, 2023

(54) MULTIFACTOR IDENTITY AUTHENTICATION VIA CUMULATIVE DYNAMIC CONTEXTUAL IDENTITY

(71) Applicant: Wells Fargo Bank, N.A., San Francisco, CA (US)

(72) Inventor: Peter Bordow, Fountain Hills, AZ (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/070,297

(22) Filed: Nov. 28, 2022

Related U.S. Application Data

(63) Continuation of application No. 17/353,126, filed on Jun. 21, 2021, now Pat. No. 11,514,155, which is a
(Continued)

(51) Int. Cl.
*H04L 9/40* (2022.01)
*H04W 12/06* (2021.01)
(Continued)

(52) U.S. Cl.
CPC .............. *G06F 21/45* (2013.01); *G06F 21/32* (2013.01); *H04L 63/083* (2013.01); *H04L 63/0853* (2013.01); *H04L 63/0861* (2013.01); *H04W 12/068* (2021.01); *G06F 3/04847* (2013.01); *G06F 2221/2111* (2013.01); *H04L 2463/082* (2013.01)

(58) Field of Classification Search
CPC .. G06F 21/45; G06F 21/32; G06F 2221/2111; G06F 3/04847; H04L 63/0861; H04L 63/083; H04L 63/0853; H04L 2463/082; H04W 12/0608
See application file for complete search history.

(56) References Cited

U.S. PATENT DOCUMENTS 9,876,788 B1 1/2018 Ziraknejad et al.
9,985,964 B2 5/2018 Andrade
(Continued)

OTHER PUBLICATIONS

Intelligent authentication for identity and access management: a review paper, by Ishaq Azhar Mohammed, Publised Jan. 2013 (Year: 2013).*
(Continued)

*Primary Examiner* — Vu V Tran
(74) *Attorney, Agent, or Firm* — Foley & Lardner LLP

(57) ABSTRACT

Disclosed are example methods, systems, and devices that allow for generation and maintenance of a central identity databank for a user's digital life. The identity databank may include identity elements with payload values and metadata values corresponding immutable attributes of the user. A multifactor identity authentication protocol allows service provider devices to more reliably validate transactions with user devices via an identity system. The identity databank may include passwords, which may be generated by the identity system linked to user accounts and/or service providers. The passwords may be provided to service provider devices, eliminating the need for users to conceive of a multitude of varying passwords for the user's accounts.

20 Claims, 19 Drawing Sheets

Related U.S. Application Data continuation of application No. 16/269,175, filed on Feb. 6, 2019, now Pat. No. 11,048,794, which is a continuation of application No. 16/268,288, filed on Feb. 5, 2019, now Pat. No. 11,290,448.

(51) Int. Cl.
*G06F 21/45* (2013.01)
*G06F 21/32* (2013.01)
G06F 3/04847 (2022.01)

(56) References Cited

U.S. PATENT DOCUMENTS

| | | |
|---|---|---|
| 10,063,568 B1 | 8/2018 | Ford et al. |
| 10,701,067 B1 | 6/2020 | Ziraknejad et al. |
| 2007/0118758 A1 | 5/2007 | Takahashi et al. |
| 2014/0157381 A1 | 6/2014 | Disraeli |
| 2015/0261945 A1* | 9/2015 | Johansson ............ H04L 63/083 726/7 |
| 2016/0065570 A1* | 3/2016 | Spencer, III ..... G06Q 20/40145 726/7 |
| 2018/0260582 A1* | 9/2018 | Brouwer ............... H04L 67/306 |
| 2018/0309792 A1 | 10/2018 | Obaidi |
| 2019/0068604 A1* | 2/2019 | Legault .................. H04L 63/08 |
| 2019/0114643 A1 | 4/2019 | Dewitt et al. |
| 2019/0342276 A1* | 11/2019 | Sherif ..................... H04L 63/08 |

OTHER PUBLICATIONS

Multifactor Identity Verification Using Aggregated Proof of Knowledge, by Elisa Bertino, et al., Published 2010 (Year: 2010).*

\* cited by examiner

MULTIFACTOR IDENTITY AUTHENTICATION VIA CUMULATIVE DYNAMIC CONTEXTUAL IDENTITY

CROSS REFERENCE TO RELATED APPLICATION

This application is a continuation of U.S. patent application Ser. No. 17/353,126 filed Jun. 21, 2021, which is a continuation of U.S. patent application Ser. No. 16/269,175 filed Feb. 6, 2019, which is a continuation of U.S. patent application Ser. No. 16/268,288 filed Feb. 5, 2019, the entire contents of each of which are incorporated herein by reference.

TECHNICAL FIELD

The present disclosure relates to generation and management of an identity databank capturing the digital identity of users, and authentication of users based at least in part on digital identity.

BACKGROUND

Technology and the digital realm pervade virtually every aspect of modern society. Different aspects of each person's daily lives are either conducted in the digital realm or captured therein. However, how digitized information representing a person's life are recorded, managed, and secured is fragmented, inconsistent, unreliable, and/or out of the person's control.

SUMMARY

Various embodiments of the disclosure relate to a method for multifactor authentication. Multifactor authentication may be performed using a contextual identity profile library. The method may comprise accepting a first transmission from a service provider device with which a first user device is transacting. The first transmission may comprise a request for user data. The first transmission may also include a biometric. The biometric may have been input by a user via one or more sensors of the first user device. The biometric may have been received by the service provider device from the first user device. The method may also comprise confirming that the request from the service provider device is valid. The request may be confirmed via a second transmission to at least one of the first user device and a second user device. The method may moreover comprise comparing the biometric to data in an identity databank to verify the user. The identity databank may comprise identity elements. Each identity element may have one or more payload values and/or one or more metadata values. The method may additionally comprise determining that a first profile indicates the requested user data is accessible to the service provider device. The first profile may be a part of a profile library. The profile library may further comprise a second profile. The second profile may identify other user data accessible to other entities. The method may further comprise retrieving, from the identity databank, the requested user data from one or more identity elements in the identity databank. The method may furthermore comprise initiating a third transmission with the requested user data to the service provider device.

Various embodiments of the disclosure relate to a central identity system. The identity system may comprise a network interface configured to communicate via a telecommunications network. The identity system may also comprise a processor and a memory having stored thereon instructions that, when executed by the processor, cause the processor to perform specific functions. The instructions may cause the processor to accept a first transmission from a service provider device of a service provider. A user may be transacting with the service provider device using a first user device. The first transmission may comprise a request for user data and/or a request for authentication. The first transmission may additionally or alternatively comprise biometric data corresponding to the user. The biometric data may have been detected by one or more sensors of the first user device. The biometric may have been transmitted to the service provider device by the first user device. The instructions may also cause the processor to initiate a second transmission to the first user device or a second user device of the user. The second transmission may be initiated to confirm that the user authorizes the identity system to transmit the requested user data/authentication to the service provider device. The instructions may moreover cause the processor to validate the biometric data from the service provider device. The biometric data may be validated using an identity databank. The identity databank may be maintained by the central identity system. The identity databank may comprise identity elements corresponding to the user. Each identity element may comprise a set of one or more payload values and/or a set of one or more metadata values. Validating the biometric data may comprise determining that the biometric data matches or is sufficiently similar to values in one or more corresponding identity elements in the identity databank. The instructions may additionally cause the processor to retrieve payload and/or metadata values corresponding to the user data requested in the first transmission. The payload values may be retrieved from identity elements in the identity databank. The instructions may further cause the processor to initiate a third transmission to the service provider device. The third transmission may comprise the payload and/or metadata values retrieved from the identity databank.

Various embodiments of the disclosure relate to a method for multifactor authentication. The method may comprise accepting an authentication request. The authentication request may be received from a service provider device. The service provider device may be in communication with a first user device. The authentication request may comprise a set of payload values and/or a set of metadata values. The set of payload values may include a biometric. The biometric may be acquired via a sensor of the first user device. The set of metadata values may include a date and/or a geolocation detected using a location sensor of the first user device. The method may also comprise confirming that the authentication request from the service provider device is valid. The request may be confirmed to be valid via at least one of the first user device and a second user device. The method may moreover comprise verifying the biometric. The biometric may be verified using an identity databank of a user. The method may additionally comprise generating an authentication response. The authentication response may comprise a validated dataset. The method may further comprise transmitting the authentication response to the service provider device. The method may furthermore comprise recording the authentication request. The authentication request may be recorded as part of an identity element in the identity databank.

Various embodiments of the disclosure relate to a method of verifying user identity based on geolocation data. The method may comprise generating an identity databank having a set of location elements. Each location element may identify a geolocation of a user. Each location element may additionally specify a corresponding date on which the user was detected to be at the geolocation. The method may also comprise receiving a first transmission from a service provider device. The first transmission may request verification of the user's identity. The service provider device may be in communication with a user device of the user. The first transmission may identify one or more geolocations. The method may moreover comprise determining that the one or more geolocations identified in the first transmission provide verification of the user's identity. The determination may be made based at least partly on comparisons with the set of location elements in the identity databank. The method may additionally comprise initiating a second transmission to the first device. The second transmission may indicate that the identity of the second user is verified.

Various embodiments of the disclosure relate to a method of generating and maintaining an identity databank. The method may comprise acquiring user data related to a user. The user data may be acquired by an identity system. The method may also comprise generating a set of one or more identity elements in the identity databank. Each identity element in the set may have one or more payload values. The method may moreover comprise determining, for each identity element in the set of identity elements, at least one of a first set of metadata comprising one or more dates associated with the identity element, and/or a second set of metadata comprising one or more locations associated with the identity element. The method may additionally comprise receiving instructions for control of the identity databank. The instructions may be received via a graphical interface with one or more visually perceptible elements. The graphical interface may be configured to allow the user to control sources for the user data acquired by the identity system. The graphical interface may alternatively or additionally be configured to allow the user to control entities that may access values in identity elements of the identity databank. The graphical interface may also alternatively or additionally be configured to allow the user to control purposes for which identified values in the identity elements may be shared.

Various embodiments of the disclosure relate to a central identity system for generating and maintaining an identity databank. The system may comprise a network interface configured to communicate via a telecommunications network. The system may also comprise a processor and a memory having stored thereon instructions that, when executed by the processor, cause the processor to perform specific functions. The instructions may cause the processor to acquire user data related to a user. The user data may be acquired via one or more source devices. The instructions may also cause the processor to generate a set of one or more identity elements in the identity databank. Each identity element in the set may have one or more payload values. The instructions may moreover cause the processor to determine, for each identity element in the set of identity elements, at least one of a first set of metadata comprising one or more dates associated with the identity element, and a second set of metadata comprising one or more locations associated with the identity element. The instructions may additionally cause the processor to receive instructions for control of the identity databank. The control instructions may be received via a graphical interface with one or more visually-perceptible elements. The graphical interface may be configured to allow the user to control at least one of sources for the user data acquired by the identity system, entities that may access values in identity elements of the identity databank, and/or purposes for which identified values in the identity elements may be shared.

Various embodiments of the disclosure relate to a user device. The user device may comprise a network interface configured to communicate via a telecommunications network. The user device may also comprise one or more user interfaces for receiving inputs from and providing outputs to a user. The user device may moreover comprise a processor and a memory having stored thereon instructions that, when executed by the processor, cause the processor to perform specific functions. The instructions may cause the processor to accept a first input via the one or more user interfaces. The first input may request registration for an identity service. The identity service may be administered by a central identity system. The instructions may also cause the processor to transmit an indication that the identity service has been requested. The indication may be transmitted via the network interface and to the central identity system. Registration may cause the central identity system to generate a set of one or more identity elements in the identity databank. Each identity element in the set may have payload values and/or metadata values. The instructions may moreover cause the processor to present a graphical interface with one or more visually-perceptible elements. The graphical interface may be presented via the one or more user interfaces. The graphical interface may be configured to allow the user to control at least one of sources for user data acquired by the central identity system in generating the identity databank, entities that may access, via the central identity system, values in identity elements of the identity databank, and/or purposes for which identified values in the identity elements may be shared by the central identity system.

These and other features, together with the organization and manner of operation thereof, will become apparent from the following detailed description and the accompanying drawings.

DETAILED DESCRIPTION

Figure 1:
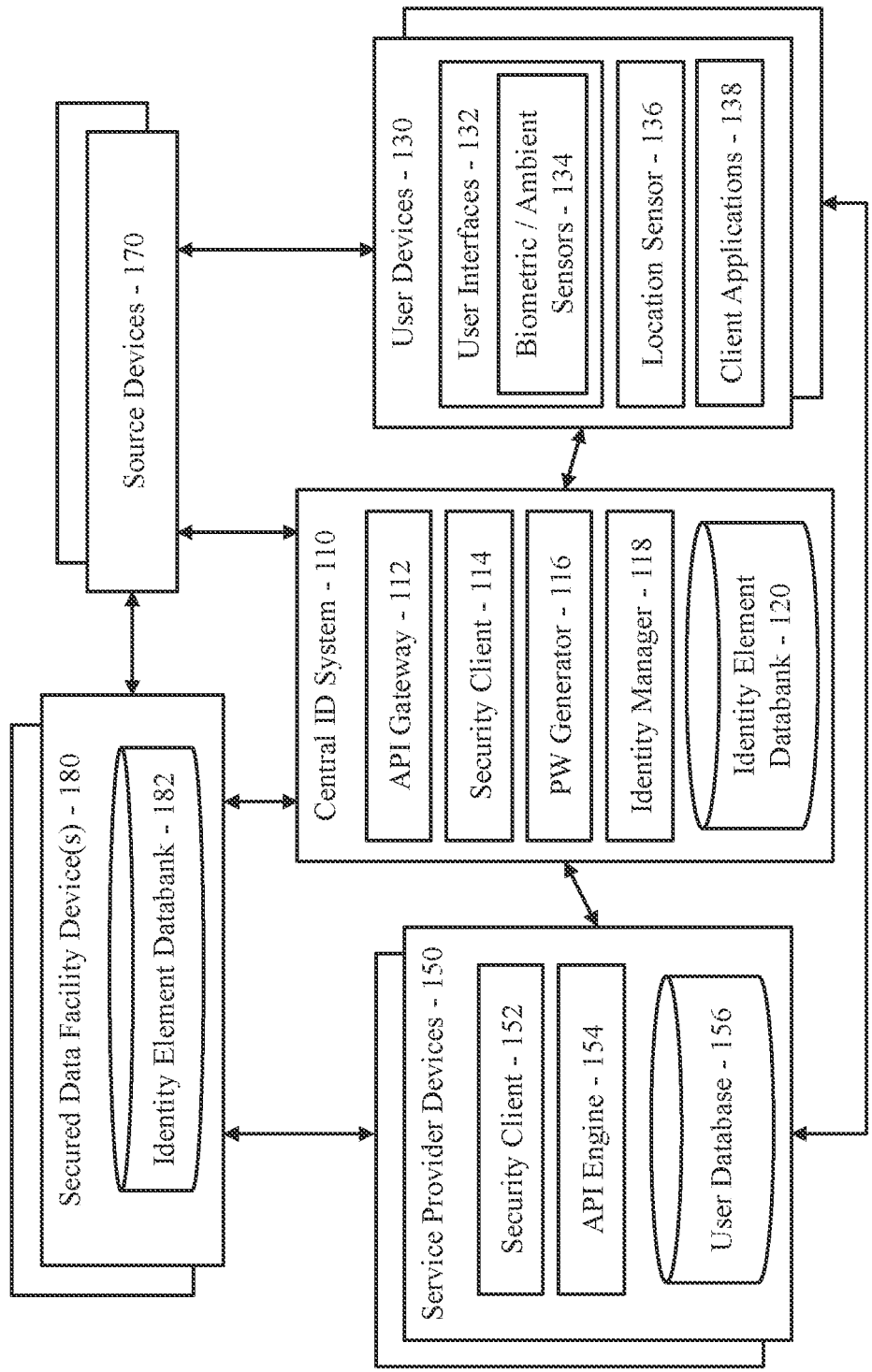
FIG. 1 is a block diagram of a computer-implemented system, with a central identity system in communication with various devices, according to example embodiments.

Various embodiments described herein relate to systems and methods for generating and maintaining a unified identity databank, and providing multifactor authentication using data in identity databanks. In certain versions, identity may be defined as an immutable series of attributes and events that accumulate and persist over time for a given entity. Identity is critical because it is a core enabler for a wide range of services at scale, such as banking, government services, healthcare, and effectively all transactions requiring authentication of users. Identity theft and fraud can be traced to the core of the current, fragmented digital identity construct, which exists today in many forms and on many systems. The legal and social effects of digital identity are complex and challenging, can be inefficient, and in many cases can present a risk. The significant risks and shortcomings of traditional identity models include, for example, lack of security, redundancy, lack of standardization, fragmentation, lack of control, incomplete identity governance, and/or non-universality. As will become more apparent, a single, unique, unified digital identity databank as disclosed herein offers several advantages, with centralized data that is more trustworthy in part because sources of data are better managed and data is validated.

Example versions of the identity databank may capture aspects of a user's life over which he or she has no control, such as where the user was born, as well as choices made in life, such as how the user spends his or her time, where he or she travels, and so forth. Certain identity elements may develop and evolve over time, sometimes drastically, depending on what directions and actions are taken in life, while other identity elements remain unchanged, either historically or biologically. Identity elements may represent a series of attributes and events that accumulate and persist over time for a given entity. The identity elements may be made immutable by various metadata. For example, although a user's hair color may change over time, the user's hair color at a specific time and place is not expected to change.

Identity is foundational to many of the transactions that occur in today's society. In exchanges between two transacting parties, one party may have requirements for the transaction to proceed (e.g., a party must be a certain age, reside in a certain jurisdiction, or have been granted access to a specific system or facility), the identity databank allow entities to determine certain information about their counterparty, and to have confidence that the information is true. Most transactions require a verifiable identity to determine if the necessary conditions for the transaction to occur exist, to establish a relationship for repeated transactions, or to tailor delivery of products and services. The information exchange can be targeted and tailored to enhance efficiency, improve confidentiality, etc. If an entity were to present his or her ID (e.g., a driver's license) to prove age, he or she gives more information than is needed (e.g., name, date of birth, address, height, weight, eye color, whether the entity is an organ donor, etc.), when all that is needed to verify is this your date of birth. This risk is often increased in the digital world due to the fragmented and poorly managed elements of one's digital identity. For example, when a person wishes to log into a system or engage in a transaction, the person often gives away more data than they would like or need.

The disclosed approach thus addresses, for example: lack of security in one's digital identity, which has made hacks resulting in the release of private information too commonplace, and identity theft widespread; redundancy due to the lack of communication between systems (as experienced each time a user registers for an account at another website or in another application, or produces the same documents to another entity); lack of standardization in how identities are assigned, listed, or shared, as each entity stores identity information in its own way; identity fragmentation resulting from the aggregation of information from multiple sources and storage in in multiple different places (from government and bank databases to those of marketers and fraudsters); lack of control over digital identity, making it difficult if not impossible to review who holds what information about particular users, because in the digital world, information can be very easily held, copied and used without permission or awareness; lack of universality, as millions of people in the world have no official identities due to a lack of credentials.

Embodiments of the disclosed approach thus serve as a core enabler for a wide range of services at scale, such as banking, government services, healthcare and effectively all transactions requiring authentication of users. A single, unique digital identity construct offers a number of advantages. For example, traditional passwords may be replaced with identity-based authentication systems. Random identity elements may be selected from secure identity elements, each element having a header time/date, source, location, and/or data content. Creation and composition of passwords may be recorded in an identity databank with a link to various entities and/or accounts, eliminating the need for the user to generate, see, remember and/or manage passwords. Proof of age or other identity elements may be provided without exposure to unrelated identity elements. Non-authenticated identities, such as those stolen and traded on the black market, are devalued. A common framework for establishing trusted identities for individuals, entities (organizations) and devices can be achieved (something useful for, e.g., the developing Internet of Things). Secure, context-specific identity validation or confirmation for common services such as hotel check-in, financial institutions, social services, car rental, online authentication, etc., can be achieved. And the risk of physical documents being falsified, altered, or tampered with can be reduced.

Referring to FIG. 1, a block diagram of a system 100 enabling generation of an identity databank, management of a user's digital identity, and multifactor, contextual authentication according to example embodiments is shown. The system 100 includes a central identity system 110 (e.g., an ID management system of a trusted ID service provider), which may be implemented using one or more computing devices. The system 100 also includes one or more user devices 130, one or more service provider devices 150, one or more source devices 170, and one or more secured data facility devices 180. The components of the system 100 may be communicably and operatively coupled to each other over a network that permits the direct or indirect exchange of data, values, instructions, messages, and the like (represented by the double-headed arrows in FIG. 1).

Each device in system 100 may include one or more processors, memories, network interfaces, and user interfaces. The memory may store programming logic that, when executed by the processor, controls the operation of the corresponding computing device. The memory may also store data in databases. The network interfaces allow the computing devices to communicate wirelessly or otherwise. The various components of devices in system 100 may be implemented via hardware (e.g., circuitry), software (e.g., executable code), or any combination thereof.

Identity system 110 may also include an application programming interface (API) gateway 112 to allow other systems and devices to interact with identity system 110 via various APIs, such as APIs that facilitate authentication, data retrieval, etc. The identity system 110 may provide various functionality to other devices through APIs. Generally, an API is a software-to-software interface that allows a first computing system of a first entity to utilize a defined set of resources of a second (external) computing system of a second (third-party) entity to, for example, access certain data and/or perform various functions. In such an arrangement, the information and functionality available to the first computing system is defined, limited, or otherwise restricted by the second computing system. To utilize an API of the second computing system, the first computing system may make an API call to the second computing system. The API call may be accompanied by a security or access token or other data to authenticate the first computing system and/or a particular user. The API call may also be accompanied by certain data/inputs to facilitate the utilization or implementation of the resources of the second computing system, such as data identifying users, accounts, dates, functionalities, tasks, etc. In system 100, identity system 110 may accept or receive API calls via API gateway 112.

In various implementations, requests/transmissions from service provider devices 150 to identity systems 110 may be in the form of API calls from the service provider device 150 (generated, e.g., via API engine 154) and received by the identity system 110 (via, e.g., API gateway 112). Such API calls may include or be accompanied by various data, such as biometric data.

Identity system 110 may moreover include a security client 114 which may provide fraud prevention measures and security protections (such as generation of security tokens, authentication of devices, verification of biometric or other security data, etc.). The identity system 110 may also include a password (PW) generator 116, which may generate passwords for users using identity elements in identity element databank 120 (used interchangeably with identity databank). An identity manager 118 may generate, update, and maintain the identity element databank 120 for managing the digital identity of users.

User devices 130 may also include one or more user interfaces 132, which may include one or more biometric sensors/ambient sensors 134. User interfaces 132 may include components that provide perceptible outputs (e.g., displays and light sources for visually-perceptible elements, a speaker for audible elements, and haptics for perceptible signaling via touch), that capture ambient sights and sounds (such as cameras and microphones), and that allow the user to provide inputs (e.g., a touchscreen, stylus, force sensor for sensing pressure on a display screen, and biometric components such as a fingerprint reader, a heart monitor that detects cardiovascular signals, an iris scanner, and so forth). One or more user devices 130 may include one or more location sensors 136 to enable the user device 130 to determine its location relative to, for example, other physical objects or relative to geographic locations. Example location sensors 136 include global positioning system (GPS) devices and other navigation and geolocation devices, digital compasses, gyroscopes and other orientation sensors, as well as proximity sensors or other sensors that allow the user device 130 to detect the presence and relative distance of nearby objects and devices. The user devices 130 may include applications 138, such as a client application provided or authorized by the entity implementing or administering the identity system 110, such as an ID service provider. Example ID service providers may include trusted entities such as banks or other financial institutions, which are highly incentivized to inspire trust, prevent fraud, and maintain verified user data useful for authentication and for maintaining security.

Each service provider device 150 may also include a security client 152 which may provide fraud prevention measures and security protections (such as generation of security tokens, authentication of devices, verification of biometric or other security data, etc.). Service provider device 150 may also include API engine 154, which may utilize APIs to communicate with other devices and systems and provide various functionality. For example, API engine 154 may generate API calls to identity system 110, which may accept the API calls via API gateway 112. Service provider device 150 may include a user database 156 to maintain data of users with which the service provider device 150 interacts and transacts, such as user accounts.

Alternatively or additionally to the identity element databank 120 of identity system 110, one or more secured data facility devices 180 may maintain identity element databank 182, which may be populated, updated, and managed by the identity system 110 and/or secured data facility devices 180. The secured data facility devices 180 may be remote devices maintained by the ID service provider implementing identity system 110, and/or by one or more third-party entities. The identity element databank 120/182 may be populated, at least in part, using data acquired via source devices 170 of various entities and/or user devices 130. Example source devices 170 include devices of financial institutions, governmental entities, merchants, social networking services, and user devices of friends and family.

Figure 2:
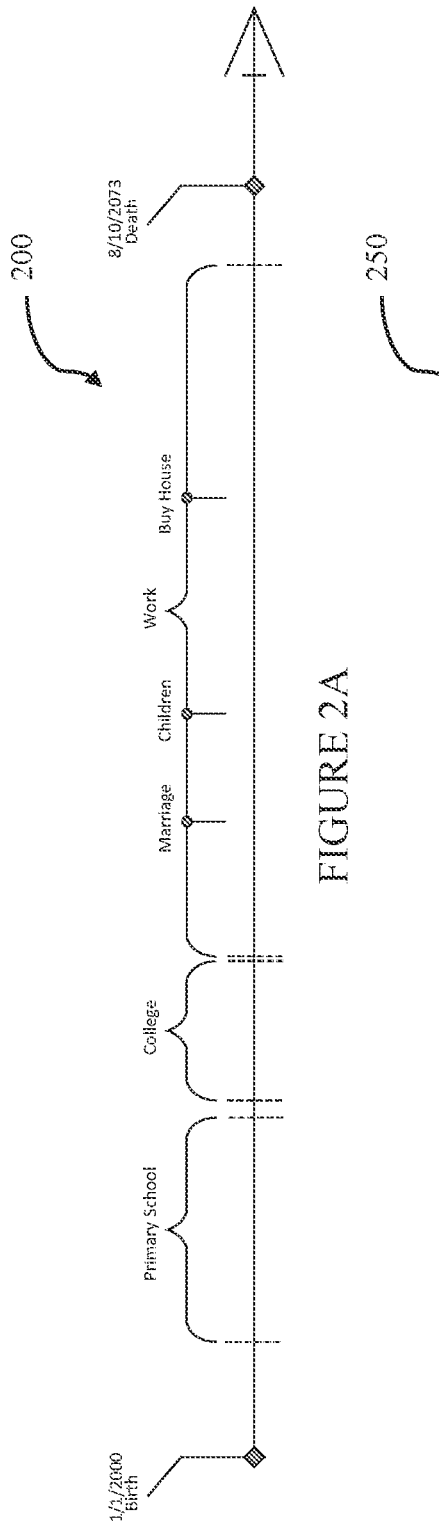
FIG. 2A is a representation of events and attributes in a user's life, according to example embodiments.
FIG. 2B provides example digital identity element categories that can be maintained in identity databanks, according to example embodiments.

FIG. 2A illustrates an example series of events 200 in a user's life, such as school (e.g., primary school, college), family life (e.g., marriage and children), career, and major purchases (e.g., a house). FIG. 2B provides an example categorization 250 of identity elements that capture events in a user's life. Over the course of an individual's identity timeline, the data points of these actions, events, and journeys accumulated over time can be sorted into categories, cumulatively constituting the basis for a fundamental digital identity. As non-exhaustive examples: "geolocation" may include, for example, elements related to where a user has been; "personal data" may include, for example, name and birthdate; "health history" may include, for example, information that might be found in health records; "romance/marriage" may include, for example, information on significant others and spouses; "work history" may include, for example, information on places and dates of employments and titles held; "charity/volunteer" may include information on, for example, charitable contributions or volunteering activities; "online posts/pics" may include, for example, textual posts and pictures/videos/other media submitted to social networking accounts; "hobbies" may include, for example, leisure or other non-employment related activities; "education" may include, for example, information on schools attended and degrees earned; "faith/religion" may include, for example, information on churches attended or religious activities; "travel" may include, for example, information on places visited; "transactions" may include, for example, information on purchases; "legal history" may include, for example, information on legal proceedings; "financial" may include, for example, information on financial accounts; "art/music" may include, for example, information on attendance at concerts and types of art and music purchased or otherwise enjoyed by a user; "state/government" may include, for example, information on licenses; "news/reports" may include, for example, information in broadcasts, publications, or reports that mention a user; and "family/friends" may include, for example, information on children, siblings, and persons with whom the user spends time or otherwise associates.

Figure 3:
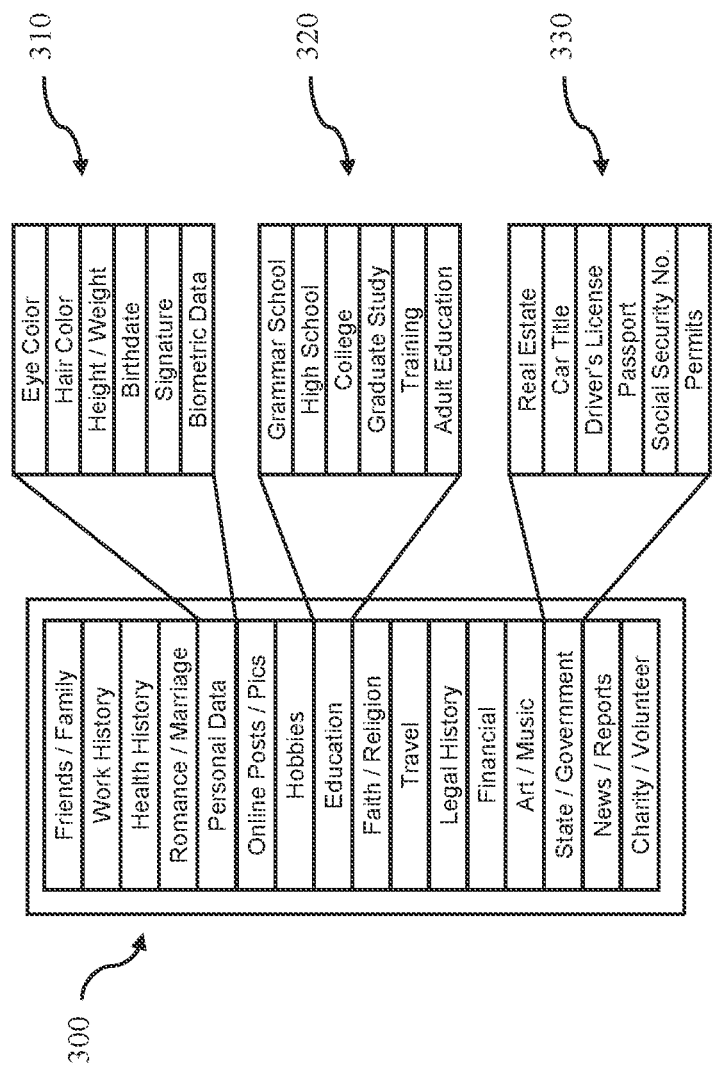
FIG. 3 is a representation of an example identity databank and identity elements corresponding with various potential identity element categories, according to example embodiments.

If each digital identity category is a data set, a more granular view of each category provides individual data elements. Referring to FIG. 3, each category in a user's identity databank 300 may include subcategories or particular identity elements that may be maintained in the identity databank 300. As depicted in FIG. 3, the category of "personal data" may include, for example, identity elements 310 corresponding to a user's eye color, hair color, height, weight, birthdate, signature, and/or biometric data. The category of "education" may include identity elements 320 corresponding to, for example, a user's grammar school, high school, college, graduate school, trainings (e.g., certifications), and/or adult education. And the category of "state/government" may include identity elements 330 corresponding to, for example, a user's real estate, car title, driver's license, passport, social security number, and/or permits.

Figure 4:
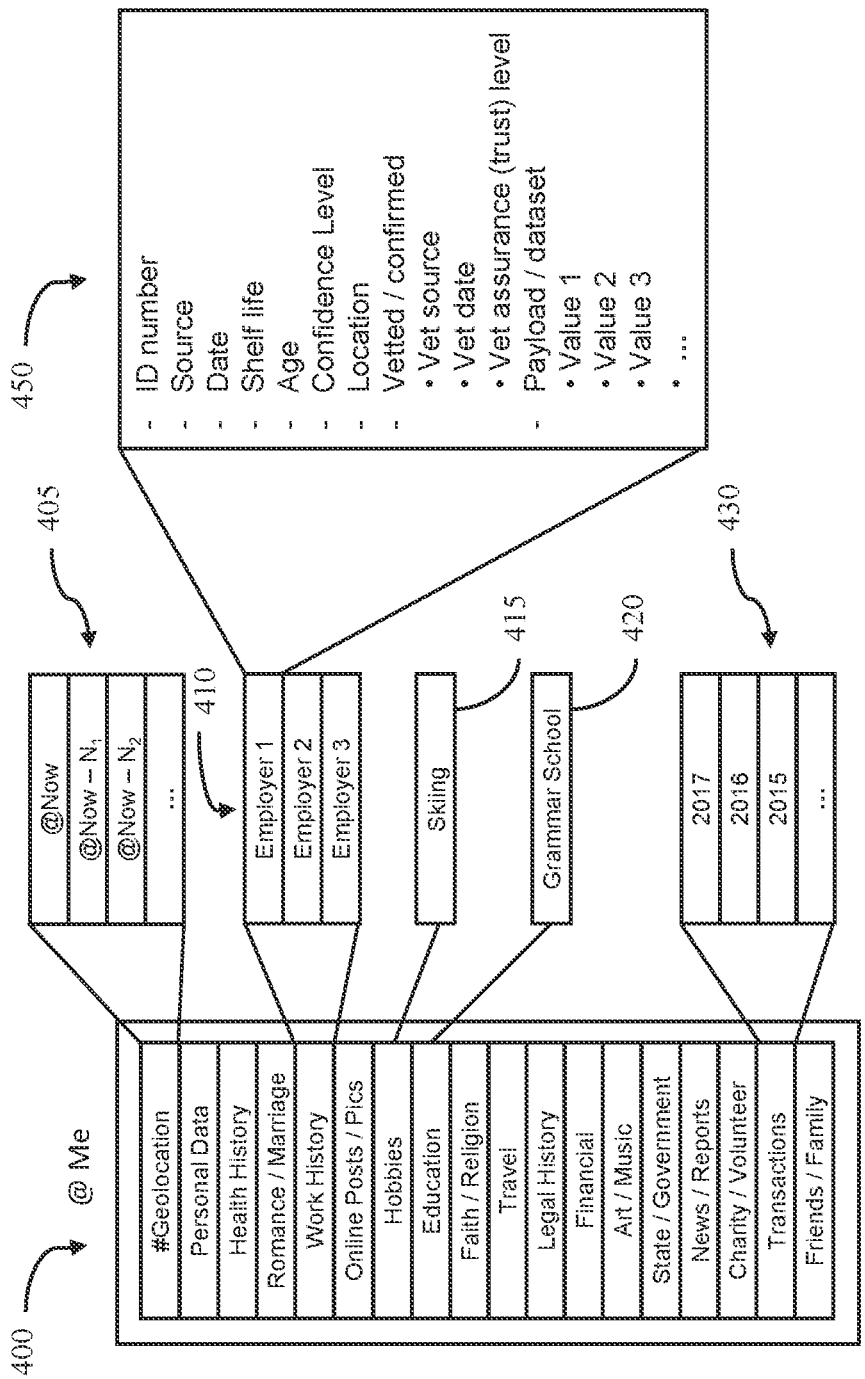
FIG. 4 is a representation of an example identity databank and identity elements corresponding with various potential identity element categories, and an example set of payload and metadata values corresponding with an example identity element, according to example embodiments.

In various implementations, metadata can be added to each of the granular data elements to allow for validation, geolocation, ageing, etc. Referring to FIG. 4, each identity element may comprise various payload values and a series of metadata. In an example identity databank 400 illustrated in FIG. 4: the category of "#geolocation" may identify, for example, a set of geolocations 405, such as a current location ("@Now") and a set of prior locations at various times ("@Now-$N_1$," "@Now-$N_2$," etc., where "@Now" corresponds with the present, and "$N_\#$" represents an amount of time); the category of "work history" may identify, for example, a set of employers 410 (e.g., "Employer 1," "Employer 2," and "Employer 3"); the category of "hobbies" may identify, for example, the hobby of "skiing" 415; the category of "education" may identify, for example, "grammar school" 420; and the category of "transactions" may identify, for example, a set of transactions 430 organized by time (e.g., years, months, etc.) or in another way (e.g., by type, location, and/or amount of transactions).

Each identity element may include various data. For example, in FIG. 4, "Employer 1" is associated with dataset 450, which may include, for example, "ID number," such as an identification number corresponding with the particular employer (e.g., a tax identification number or a unique identifier generated for Employer 1 by the identity system 110 or by another system); "source," which may identify, for example, how Employer 1 came to be known to identity system 110 (e.g., what source identified Employer 1), such as a particular source device 170 and/or a particular entity/organization; "date," which may identify, for example, when Employer 1 came to be known to identity system 110; "shelf life," which may provide, for example, a time period during which the identity element will be maintained and/or is likely to be relevant; "age," which may be, for example, an indication of how long the identity element has been known and/or the last time it was updated; "confidence level," which may be, for example, a metric for how likely the corresponding identity element is to be correct; data on vetting/confirmation ("vetted/confirmed") of the corresponding identity element, which may include, for example, corroborating sources ("vet source"), dates of corroboration ("vet date"), and trustworthiness of the source used to corroborate or otherwise vet the identity element ("vet assurance (trust) level"); and "payload" values, which may include, for example, the user's title at Employer 1, the date Employer 1 was founded or legally established, the date the user started working at the employer, the date the user left the employer, variations of Employer 1's name, etc.

Figure 5:
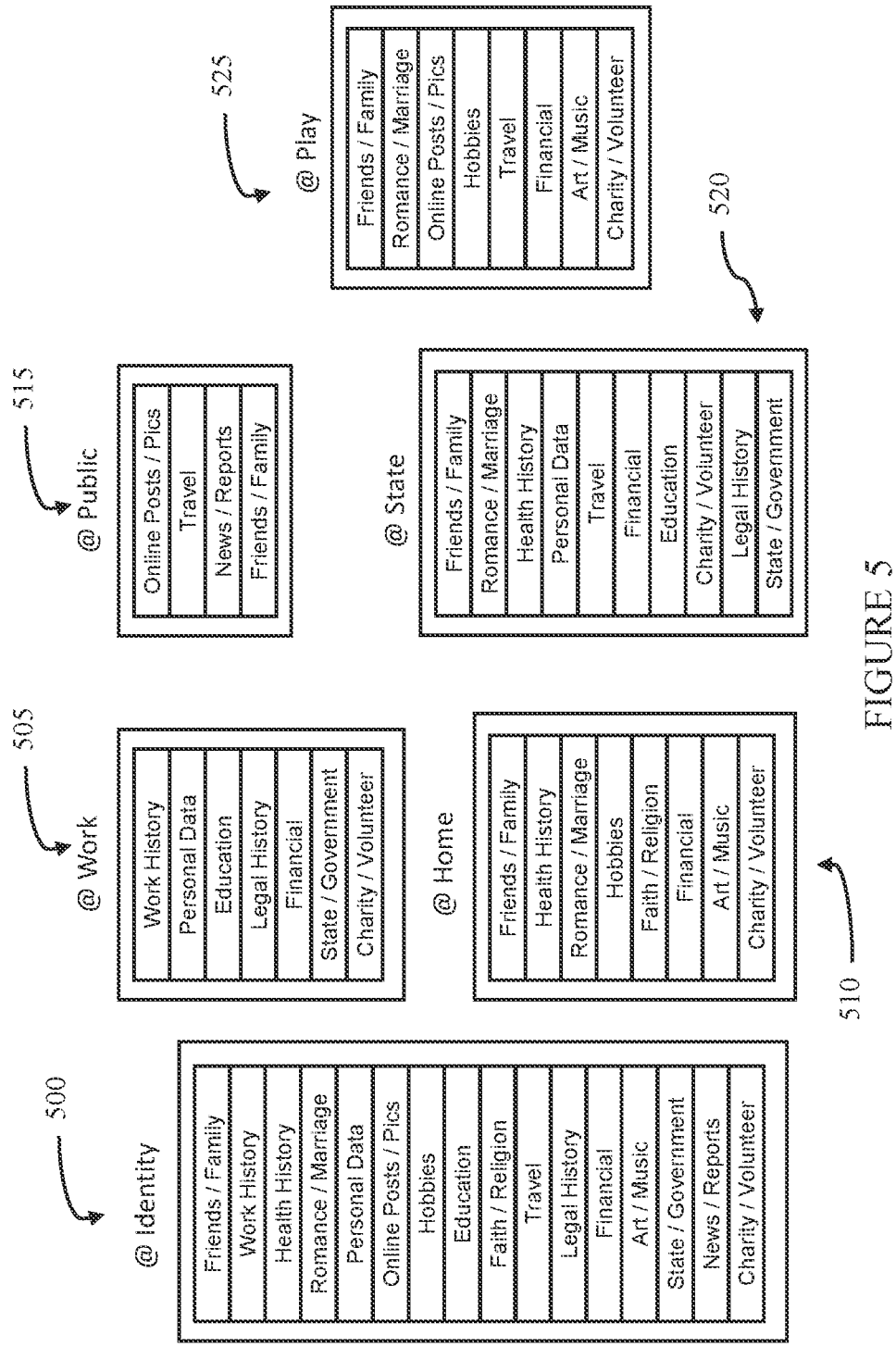
FIG. 5 is a representation of an example set of contexts in which identity elements (or categories thereof) may be generated or used, or are otherwise relevant, according to example embodiments.

Identity elements may be organized, categorized, and/or shared in various ways. For example, identity elements may be relevant to different aspects of a user's life. An identity may be defined by a context of the communities in one's life; the picture of "who you are" differs, or is made up of a unique set of identity elements, based on the contexts (or communities) in one's life. For example, the scope of who one is known as at work may contain a different data set of elements than for who one is known as on one's softball team or at one's place of worship. In FIG. 5, subsets of identity databank 500 ("@ identity") may include, for example: an "@ work" subset 505 with identity elements related to, for example, "work history" and "education"; an "@ home" subset 510 with identity elements related to, for example, "friends/family" and "romance/marriage"; an "@ public" subset 515 with identity elements related to, for example, "online posts/pics" and "news/reports"; an "@ state" subset 520 with identity elements related to, for example, "legal history" and "state/government"; and an "@ play" subset 525 with identity elements related to, for example, "hobbies" and "travel." These different categories provide context for the arrays of identity elements in the identity databank of a user.

Figure 6:
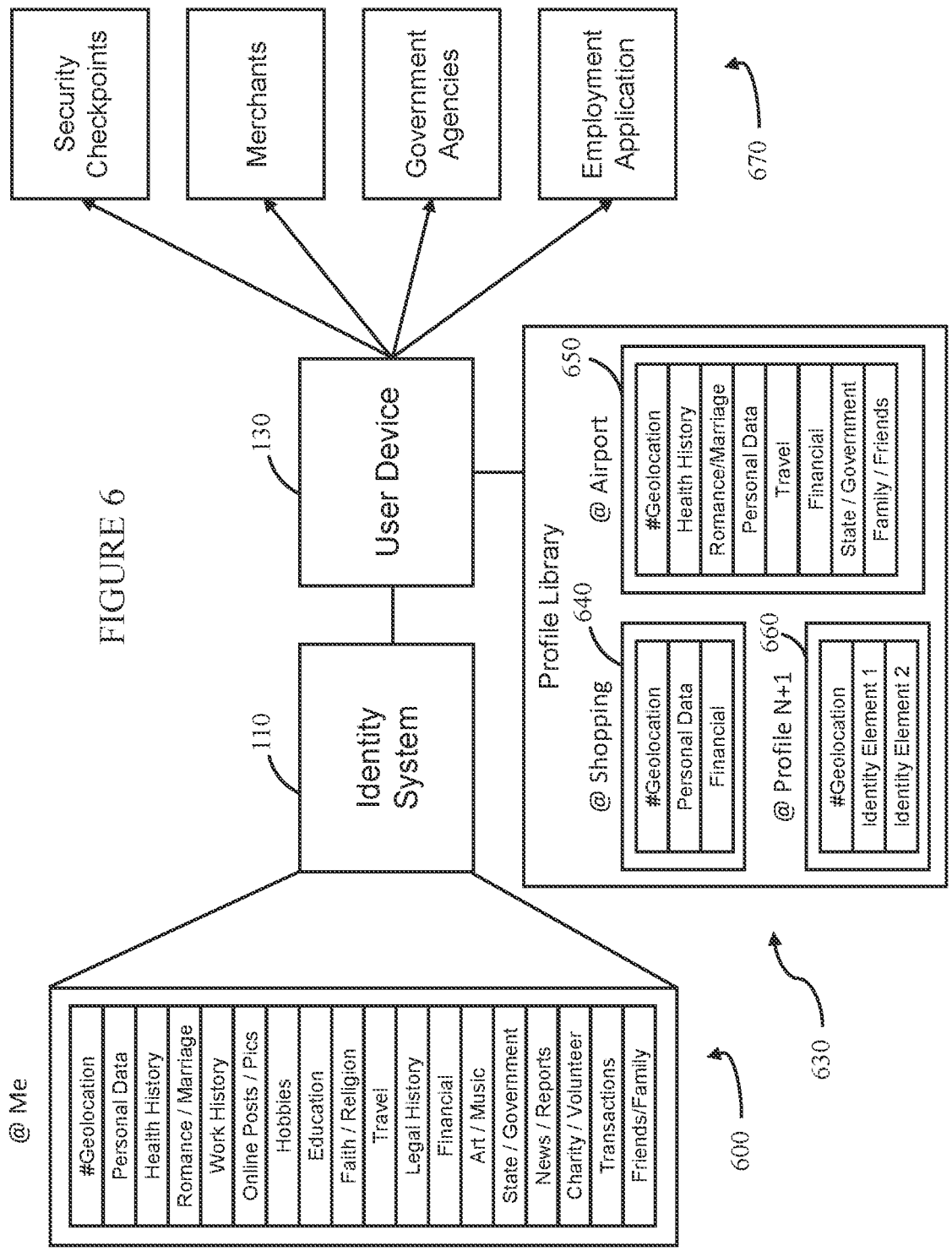
FIG. 6 is a representation of an example profile library which may be defined and used in different contexts, according to example embodiments.

To enhance the disclosed approach in the context of transitional and transactional events in life, such when one is grocery shopping or traveling through airport security, a consistent geolocation element can be added to data sets to provide a powerful verification/authentication tool. A digital profile library, in which individual data elements from one's complete identity can be grouped, saved, and applied more efficiently, helps an identity owner better define any number of identity profiles, each with granular control of data elements. This in turn gives the identity owner power over the release and exposure of identity elements. Because different data elements are relevant to different entities and/or for different purposes, identity elements may be selected in defining profiles in a profile library. In FIG. 6, identity databank 600 may be maintained by identity system 110 (e.g., as part of identity element databank 120 and/or identity element databank 182). A user device 130 may be used to define a device profile 630, which in FIG. 6 includes three profiles, labeled as "@ shopping" profile 640, "@ airport" profile 650, and "@ Profile N+1" profile 660 (which represents additional potential profiles). Once defined, selected profiles in profile library 630 may be used for various objectives 670. For example, the shopping profile 640 may be used at various merchants, the airport profile 650 may be at security checkpoints, and other profiles may be used at government agencies, for employment applications, and so forth. Advantageously, a limited, select subset of identity elements may be made available to various entities and/or used for various purposes, helping maintain privacy/confidentiality for users by avoiding release of unnecessary information, and enhancing efficiency by providing the particular identity elements that are relevant or requested and not extraneous identity elements.

Figure 7:
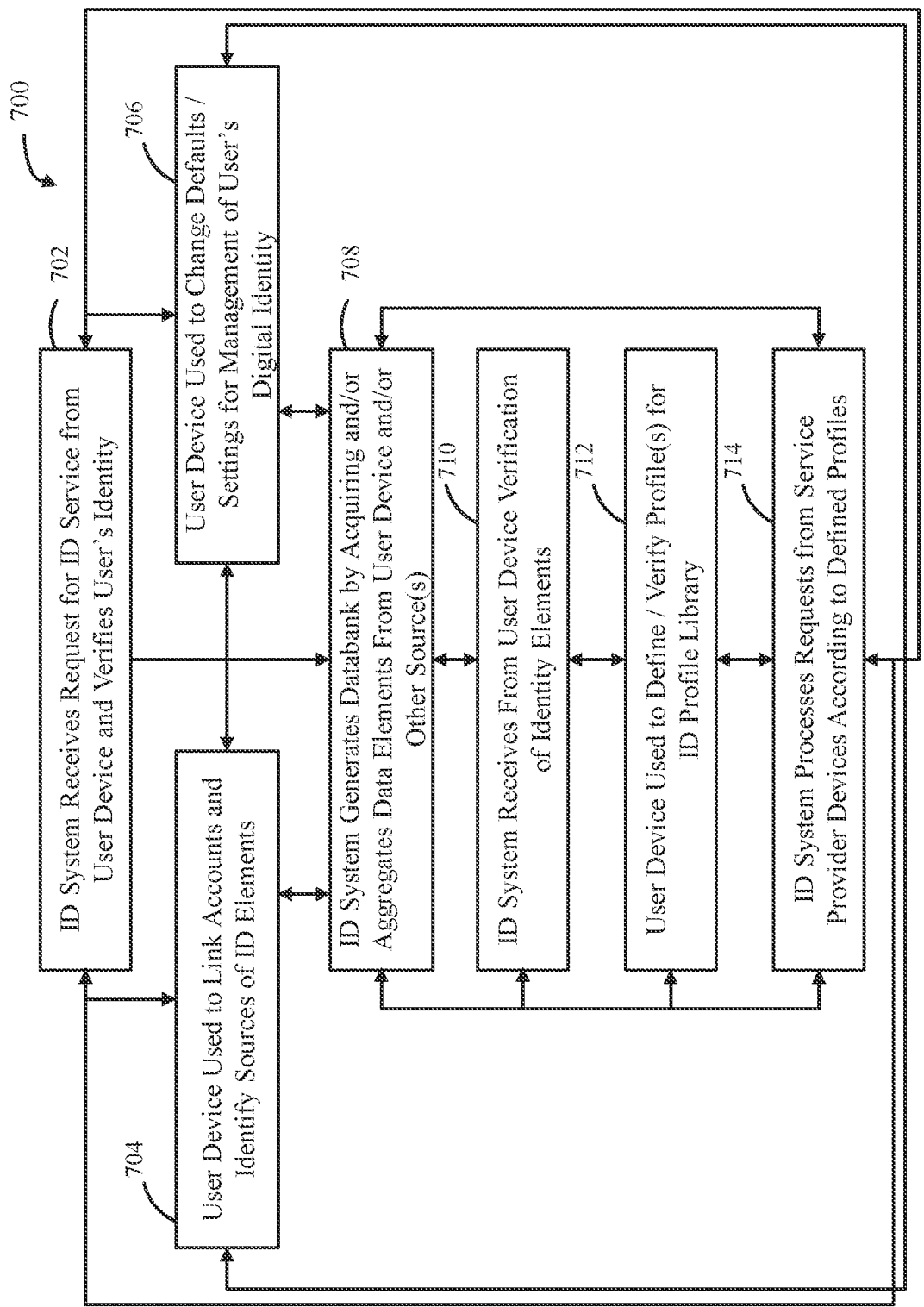
FIG. 7 is a flow diagram of an example process for registering for an identity service and controlling/managing an identity databank, according to example embodiments.

FIG. 7 is a flow diagram of a method 700 for registering with identity system 110 of a trusted entity for an identity service, according to example embodiments. A user may register for the identity service to have the trusted entity maintain an up-to-date, centralized identity databank for a user's digital life, and provide limited subsets of the data to particular entities or for particular purposes as defined in the user's profile library. At 702, the identity system 110 may receive a request for the identity service from a user device 130. This may be accomplished via a website or application provided by the identity system 110, such as a client application 138 of the ID service provider. At 704, the user may link accounts or otherwise identify sources of identity data. For example, a user may link one or more financial accounts by identifying financial institutions and providing account numbers, login credentials, and/or other information needed to allow the identity system 110 to access the accounts being linked with the user's identity service. Linking accounts allows the user to provide the identity service with access to information that is otherwise not public and that may be more trustworthy than other sources (because, e.g., it is verified information from the user or because there is incentive to maintain accurate information). The ability to control the sources of identity data helps provide the user more control over his or her centralized digital identity.

At 706, the user device 130 may be used to change defaults and/or settings for how the user's digital identity is managed by the identity system 110. For example, the user may identify types of data that should be included in and/or excluded from the identity databank (e.g., inclusion or exclusion of images), what sources or types of sources may or may not be tapped for identity data, (e.g., public records, certain websites), and so forth. At 708, the identity system 110 may generate an identity databank populated with data elements from user device 130 and/or other sources (such as linked accounts, public sources, etc.). At 710, the identity system 110 may receive verification/confirmation from user device 130 of various identity elements, which may have been received from user device 130 and/or from other sources. This vetting of various data elements helps enhance confidence in the accuracy of identity elements in the identity databank. At 712, the user may then employ user device 130 to define one or more profiles with the identity system 110. The profiles become part of an identity profile library that allows for enhanced control over, and more targeted release of, data in the user's digital identity. At 714, the identity system 110 may process a request from a service provider device 150 for particular identity elements from the identity databank. The identity system 110 may release data to the service provider device 150 consistent with settings, profiles, and so forth.

As indicated by the numerous double-headed arrows, the steps of method 700 may be performed in various sequences, and steps may be performed multiple times at various stages. For example, after the identity service is requested at 702, the identity system 110 may begin acquiring and aggregating data elements at 708 (from, e.g., available sources of information), without the user linking any accounts at 704, and/or without the user making selections for user settings at 706. Similarly, the identity system may process requests from service provider devices at 714 after the user requests the identity service at 702, without such intermediate steps as 710 and 712. Accounts may be linked and delinked (704), settings may be set/changed (706), updated data may be acquired/aggregated (708), previous or new identity elements may be verified (710), and profiles in the profile library may be added, deleted, or modified at any point after the user has registered for the identity service, and before and/or after the identity system 110 has processed requests from service provider devices 150.

Figure 8:
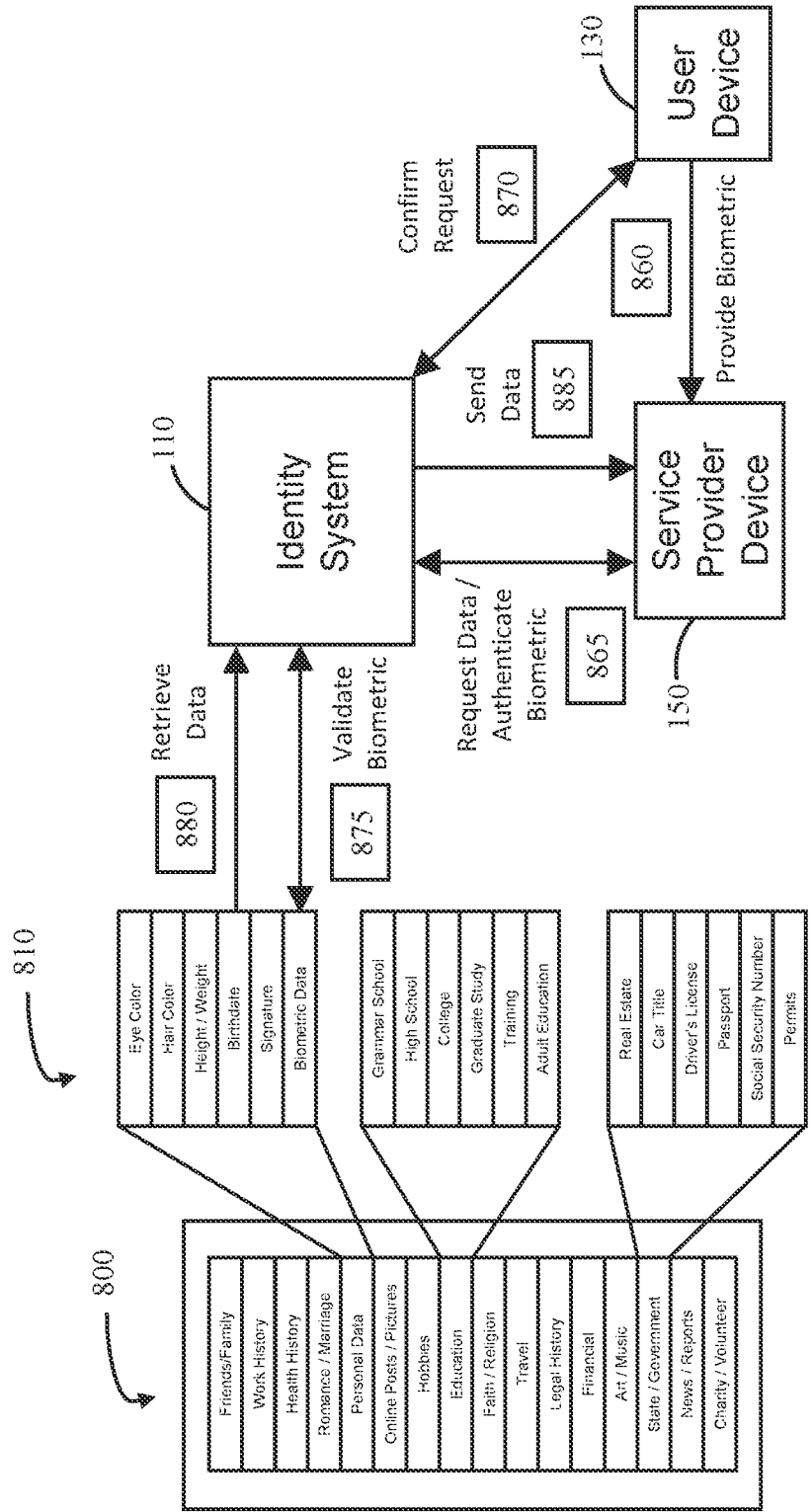
FIG. 8 represents an example process for authenticating users and/or providing requested user data from an identity databank, according to example embodiments.

FIG. 8 provides an example approach to the identity system 110 processing requests for data from service provider devices 150. Identity system 110 generates and maintains identity databank 800, which includes various categories of identity elements 810. A user device 130 may be used by a user to transact with service provider device 150 of a provider of services to the user. The user may employ user device 130 to sign up for a service, make a purchase, verify his or her identity, and so forth, via service provider device 150. Following initiation of a transaction between the user device 130 and the service provider device 150, user device 130 may acquire biometric data (e.g., via biometric/ambient sensors 134 or other user interfaces 132) and/or other security data (e.g., security/access tokens), and at 860, provide the biometric data to the service provider device 150. In some implementations, the user device 130 may provide other data, such as the present location of the user device 130 (detected via, e.g., location sensor 136).

At 865, the service provider device 150 may transmit the biometric data to the identity system 110. The biometric data may be accompanied by an identification of user data that the service provider device 150 requests from the identity system 110. The identity system 110 may confirm, at 870, with the user device 130 that the request from service provider device 150 is valid. Identity system 110 may, for example, transmit a message to user device 130 requesting confirmation/verification that: the user (via user device 130) is engaging in a (specified or unspecified) transaction with the service provider (via service provider device 150); the user has authorized the service provider to receive user data generally, or receive particular data; and so forth. The confirmation may be obtained via, for example, an exchange of text messages, e-mail messages, or other transmissions. In some implementations, a confirmation may be received via a client application 138 of the trusted entity by having the user, for example, make an affirmative selection via a popup notification or page presented via the client application 138.

In certain implementations, confirmation may alternatively or additionally include receiving a location of the user device 130 (detected via, e.g., location sensor 136, and received directly from the user device 130 or indirectly via the service provider device 150) and determining that the present location of the user device 130 corresponds with a location that is expected for the user device. The location may be expected if, for example, the location indicates the user device 130 is located at the home or workplace of the user, a merchant with which the user device is transacting, a hotel or an airport at a time expected based on a transaction that may be in the identity databank under transactions (e.g., a purchase of airline tickets), etc. The location may be unexpected or deemed suspicious if, for example, the user device 130 is more than a predetermined radius (e.g., 100 kilometers) from the user's home or workplace, is located at a new location not before known to have been visited by the user, is at a location not frequented by the user, is out of state or out of the country, is outside of an area selected by the user (e.g., via a client application 138, during or following registration for the identity service), etc.

The identity system may then, at 875, authenticate the user by validating the biometric data received from the service provider device 150. The biometric data in the identity databank may have been received from the user device 130 when the user registered for the identity service or at some point thereafter. In some implementations, the biometric data may have been received by the identity system 110 as a result of, for example, a prior relationship between the trusted entity and the user, such as the user opening a financial account with a trusted entity that is also a financial institution. The biometric data may be an identity element in identity databank 800 under, for example, "personal data." The biometric data from service provider device 150 may be validated if there is a match between the biometric data received from the service provider device 150 and the biometric data in the identity databank 800, or if the two are sufficiently similar (e.g., have consistent patterns, identical subsections, etc.). If the biometric data is validated, at 880, the identity system 110 may retrieve the requested user data from the identity databank. In various implementations, this may be accomplished by the identity system 110 determining which identity elements include or are closest to the user data requested by the service provider device 150. In some implementations, the service provider 150, in its request for user data, identifies particular identity elements and/or particular payload values and/or metadata values for specific identity elements. At 885, the identity system 110 transmits the data from the identity databank 800 to the service provider device 150, which may subsequently proceed with the transaction pending with the user device 130.

Figure 9:
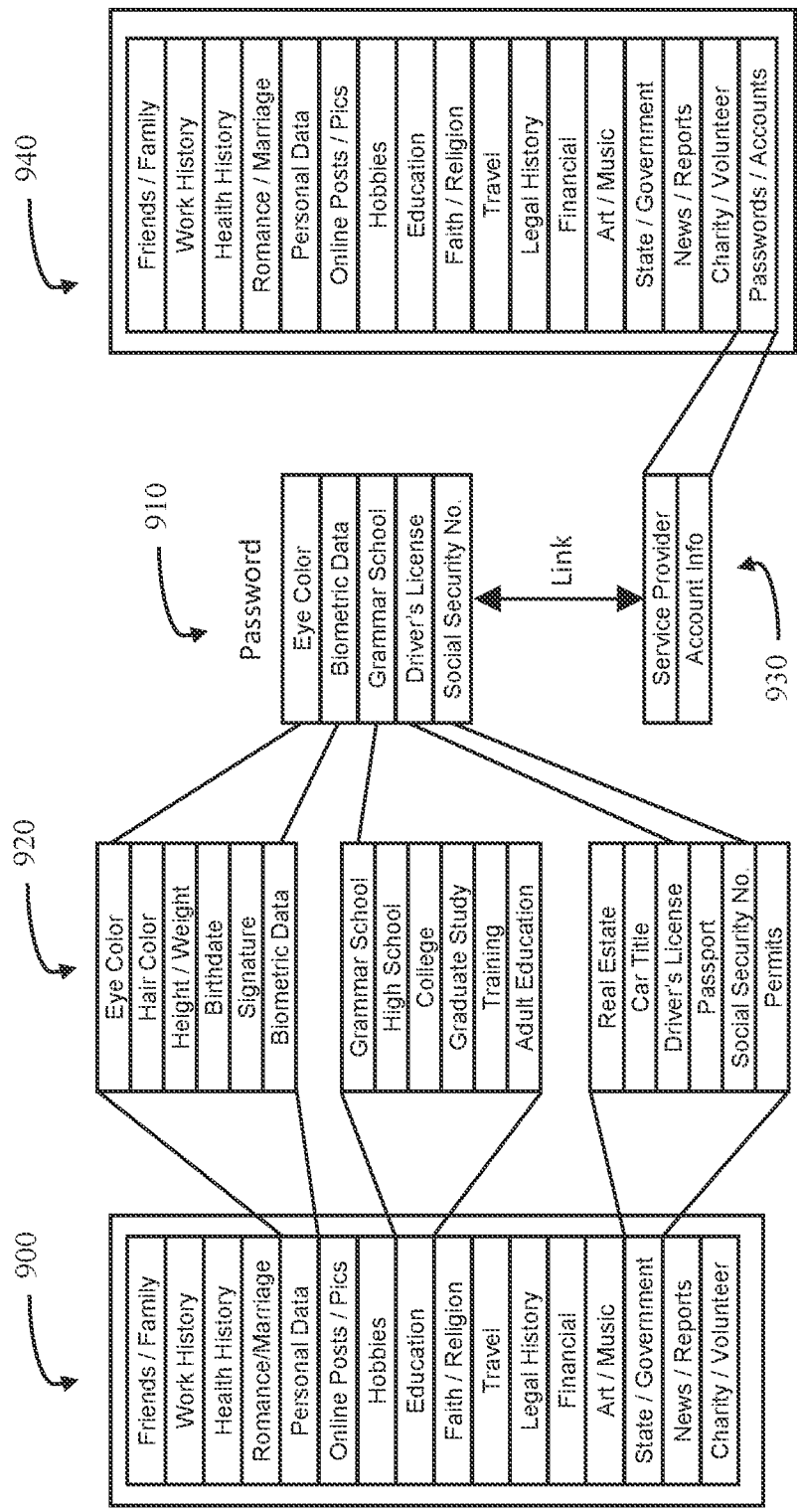
FIG. 9 represents an example identity databank with a password corresponding with select identity elements and linked with service providers and/or accounts, according to example embodiments.

Referring to FIG. 9, in various versions, an identity databank 900 may be augmented with various passwords or other access control/authentication credentials. For example, identity system 110 may generate one or more passwords 910. In certain implementations, the passwords 910 may include an identity element, or a combination of two or more identity elements, selected randomly by identity system 110, or selected via service provider device 150 and/or user device 130 (from among, e.g., identity element subset 920). The identity elements selected for a password may have particular relevance to a service provider, such as identity elements used by the service provider to authenticate a user or to provide services to the user. In some implementations, the one or more identity elements in the passwords may be tokenized or otherwise encoded or modified such that the password must be deciphered to determine the identity elements therein. In other implementations, the password does not include (or is not otherwise based on) identity elements, or the password is not used as a vehicle for providing user-specific, verified user data.

Each password 910 may be specific (linked) to one or more particular service providers and/or accounts 930. Accordingly, password 910, as well as the service providers/accounts with which the password 910 is linked, may become a part of an augmented identity databank 940 in one of various ways. For example, an identity element corresponding to the service provider may be added to augmented identity databank 940 (e.g., Service Provider 1"), and one or more corresponding passwords may be included as payload values (e.g., "Password xyz"), and particular accounts with which each password is linked may be one or more metadata values of the identity element corresponding to the service provider (e.g., "Account 123"). In other implementations, passwords and accounts/service providers may be separate identity elements, with the two linked by one or more metadata values of one or more both of the identity elements (e.g., a metadata value of a password identity element identities an account/service provider identity element, and/or a metadata value of the account/service provider identity element identifies the password identity element).

Figure 10:
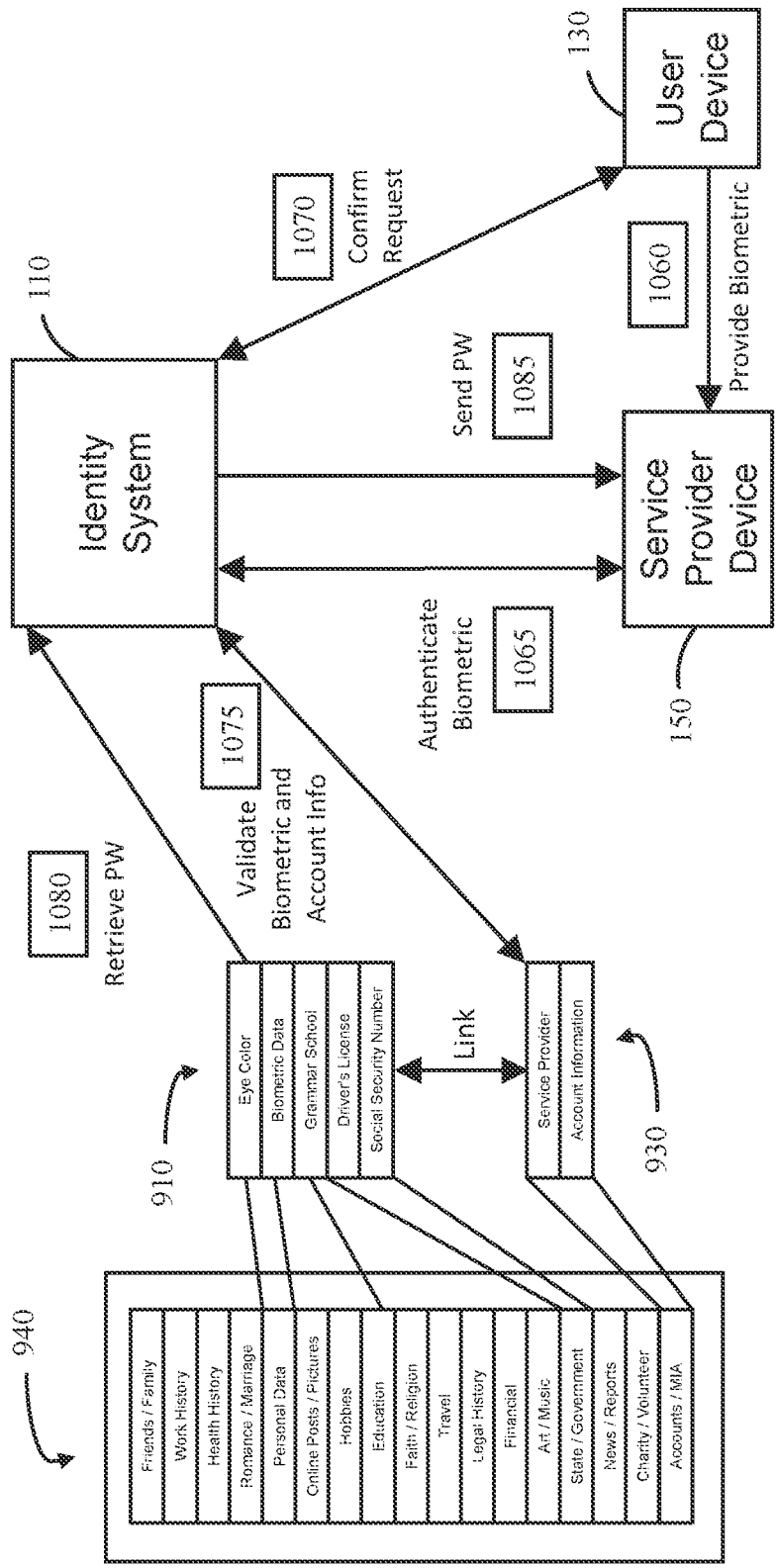
FIG. 10 represents an example process for authenticating users and providing passwords to service provider devices, according to example embodiments.

Advantageously, with passwords saved in identity databank 940, the user need not separately generate, store, note, or recall passwords, each satisfying a set of criteria and being used for different purposes/accounts. Instead, passwords may be provided by identity system 110. Referring to FIG. 10, user device 130 and service provider device 150, which may administer an account of the user, may be engaging in a transaction. Following initiation of the transaction, user device 130 may acquire biometric data (e.g., via biometric/ambient sensors 134 or other user interfaces 132) or other security data, and at 1060, provide the biometric data to the service provider device 150. In some implementations, the user device 130 may provide other data, such as the present location of the user device 130 (detected via, e.g., location sensor 136). At 1065, the service provider device 150 may transmit the biometric data to the identity system 110. The biometric data may be accompanied by an indication that the service provider device 150 requests a password from the identity system 110. The indication may, for example, identify a particular account to be accessed using the password.

The identity system 110 may confirm, at 1070, with the user device 130 that the request from service provider device 150 is valid. Identity system 110 may, for example, transmit a message to user device 130 requesting confirmation/verification that: the user (via user device 130) is attempting to access a particular account; the user is engaging in a (specified or unspecified) transaction with the service provider (via service provider device 150); the user has authorized the service provider to receive user data generally, or receive the password; and so forth. The confirmation may be obtained via, for example, an exchange of text messages, e-mail messages, or other transmissions. In some implementations, a confirmation may be received via a client application 138 of the trusted entity by having the user, for example, make an affirmative selection via a popup notification or page presented via the client application 138. In certain implementations, confirmation may alternatively or additionally include receiving a location of the user device 130 (detected via, e.g., location sensor 136, and received directly from the user device 130 or indirectly via the service provider device 150) and determining that the present location of the user device 130 corresponds with a location that is expected for the user device or is otherwise not deemed suspicious. The identity system may then, at 1075, authenticate the user by validating the biometric data received from the service provider device 150. If the biometric data is validated, at 1080, the identity system 110 may retrieve the requested password. At 1085, the identity system 110 transmits the password from the augmented identity databank 940 to the service provider device 150, which may subsequently grant access to the account or otherwise proceed with the transaction pending with the user device 130.

Figure 11:
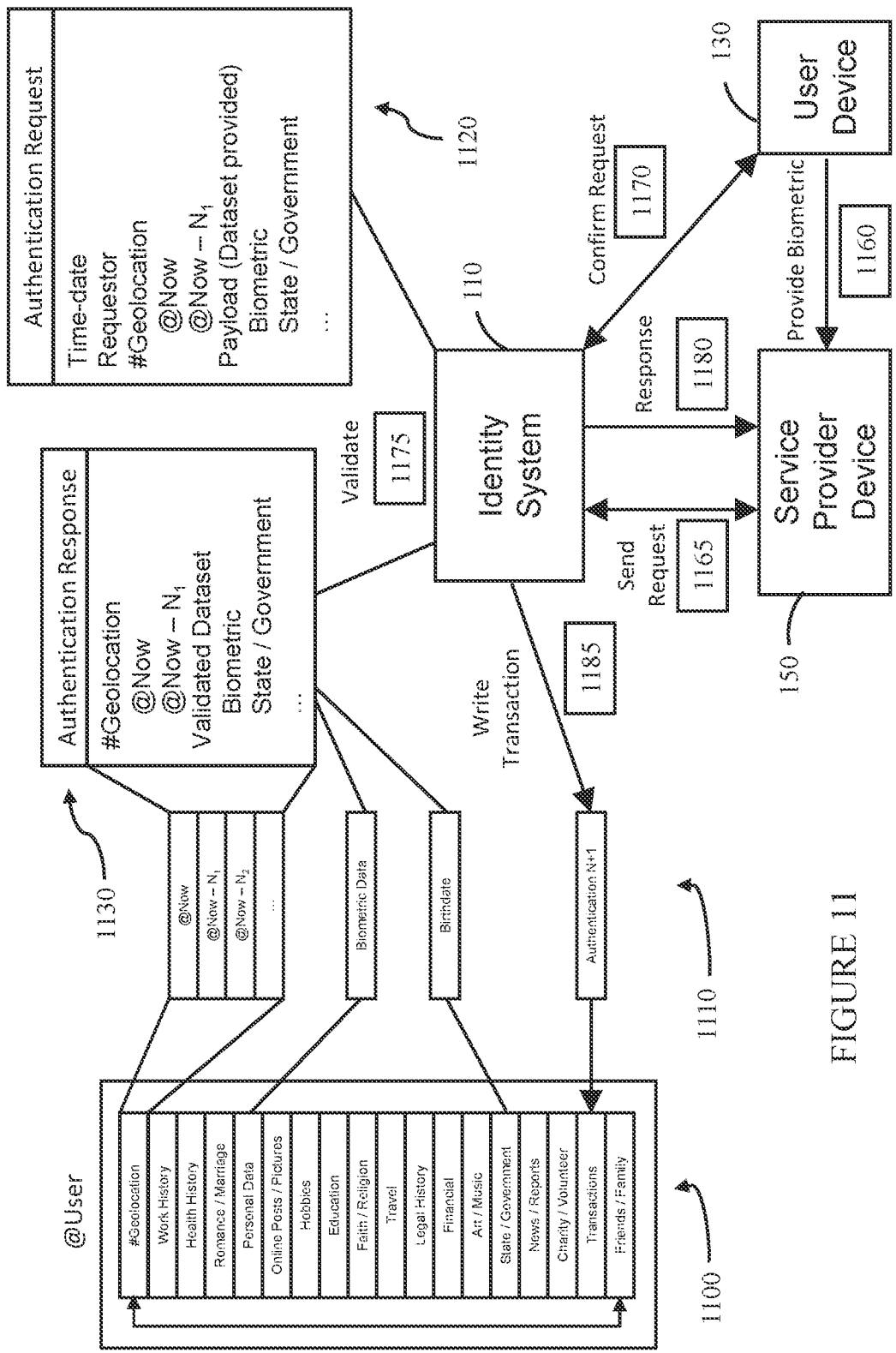
FIG. 11 represents an example process for authenticating users via an authentication response that may include geo-locations and a validated dataset, and augmenting an identity databank with the transaction, according to example embodiments.

Referring to FIG. 11, in various versions, the service provider device 150 may request that the identity system 110 authenticate a user and/or transaction between the service provider device 150 and the user device 130, without the service provider device 150 necessarily requesting particular user data. For example, a user may wish to present proof of a particular identity element (e.g., age, identity, etc.) to a service provider (e.g., a merchant such as a bar, an airport security checkpoint, etc.). A user device 130 may be presented to, or otherwise be detected to be in the vicinity of, a service provider device 150. The user device 130 may be detected and/or identified by the service provider device 150 via, for example, near-field communication (NFC), Bluetooth, connection to a wireless hotspot and identification of the serial number of the connected user device 130, etc. The user device 130 may acquire biometric data (e.g., via biometric/ambient sensors 134 or other user interfaces 132), and at 1160, provide the biometric data to the service provider device 150. In some implementations, the user device 130 may provide other data, such as the present location of the user device 130 (detected via, e.g., location sensor 136).

At 1165, the service provider device 150 may transmit an authentication request 1120 to the identity system 110. The authentication request may include, for example, a time and/or date that the user device 130 first engaged in the transaction with the service provider device 150 (e.g., when the user device 130 approached a security checkpoint), an identification of the service provider requesting authentication, geolocation data identifying the present location and/or one or more prior locations of the user device 130, and/or payload values such as the biometric acquired from the user device 130, an identification of the reason for the request (e.g., the state/government purpose), etc.

At 1175, the identity system 110 may then validate the authentication request by determining that the values in the authentication request 1120 verify, with sufficient confidence, the identity of the user. The identity system 110 may generate an authentication response 1130 with a set of geolocations, which may match or overlap the geolocations received in the authentication request 1120. For example, the authentication response 1130 may include locations corresponding to the same times as received in the authentication request 1120 (e.g., present location and location "$N_1$" ago). The authentication response 1130 may also identify or include the particular payload values that have been validated using identity databank 1100. At 1180, the identity system 1175 may transmit the authentication response to service provider device 150, which may decide whether to proceed with the transaction (e.g., permit the user to order beverages or to proceed through the security checkpoint) based on the authentication response 1130. For example, if the geolocations match and/or sufficient or satisfactory validated data is received, a user's identity may be deemed verified. At 1185, the transaction or authentication request 1110 may be written to the identity databank 1100 (e.g., as part of the transactions identity elements).

Figure 12:
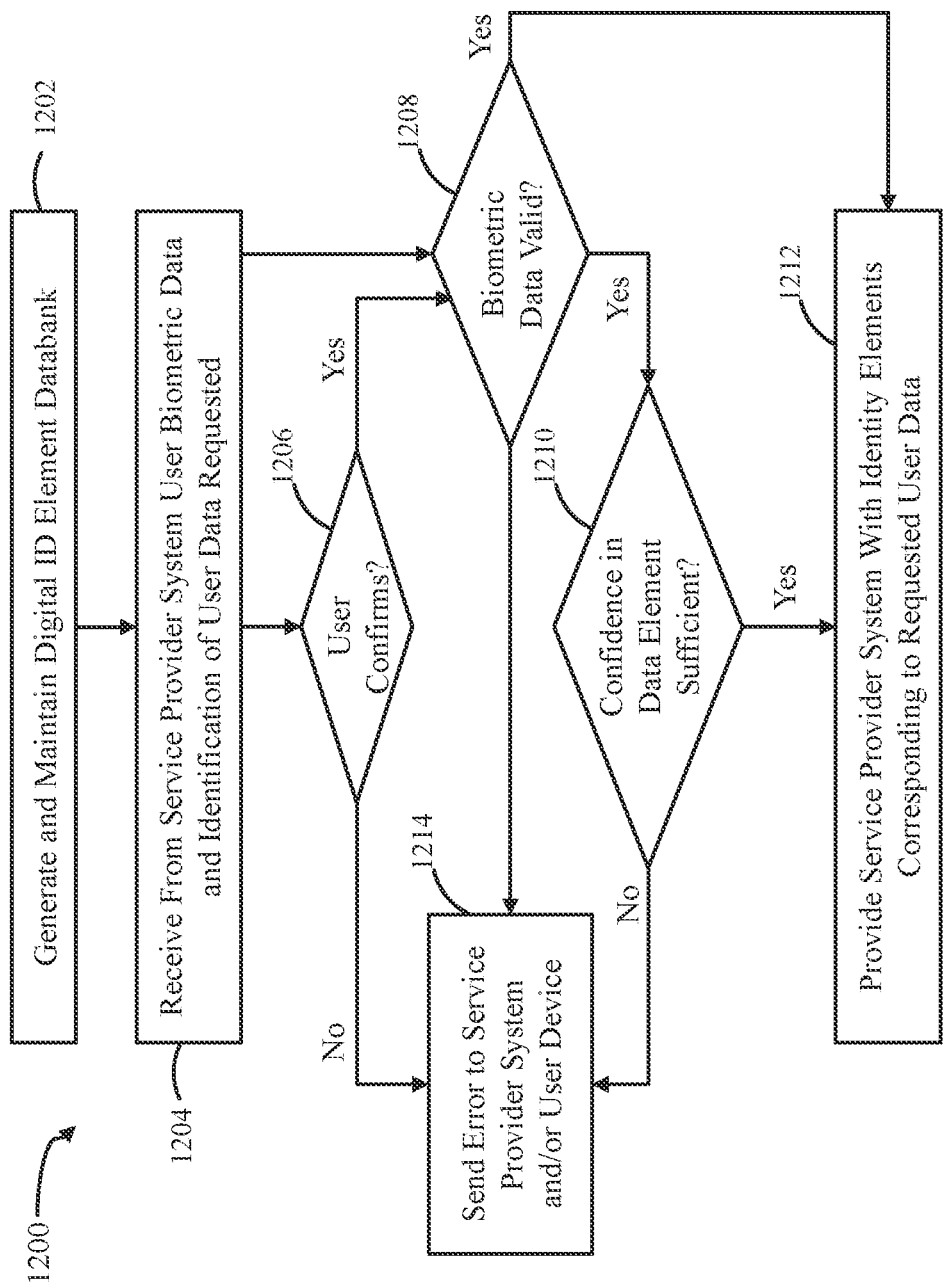
FIG. 12 is a flow diagram of an example process for generating and maintaining an identity databank and processing data requests from service provider devices, according to example embodiments.

FIG. 12 is a flow diagram of an example method 1200 implemented by identity system 110, according to example embodiments. At 1202, the identity system 110 may generate and maintain an identity element databank 120/182. At 1204, the identity system 110 receives, from a service provider device 150, a request for user data/authentication. The request may include biometric data, identification of user data being requested, and/or user data to be confirmed. At 1206, the identity system 110 may confirm with the user device 130 that the identity system 110 may process the request from the service provider device 150. If the user provides confirmation ("Yes"), at 1208, the identity system 110 may determine whether the biometric data from the service provider device 150 is valid by comparing the received biometric data with biometric data in the identity element databank 120/182. If the biometric data is valid ("Yes"), at 1210, the identity system 110 may determine whether confidence in the requested data is sufficiently high (e.g., exceeds a predetermined threshold, such as 80% likely to be accurate). The required level of confidence may be context-specific, such that, for example, a confidence threshold for specific data (e.g., health data), for particular entities (e.g., government body), or for particular purposes (e.g., a security checkpoint) may be higher than a confidence threshold for other data, entities, and purposes. If confidence is sufficiently high ("Yes"), at 1212, the identity system 110 may provide the service provider device 150 with identity elements corresponding to the requested user data. If the user device 130 does not provide confirmation at 1206, if the biometric data is not determined to be valid at 1208, and/or if confidence in the requested data is not sufficiently high at 1210, then identity system 110 may, at 1214, send an error message to the service provider device 150 and/or to the user device 130.

Figure 13:
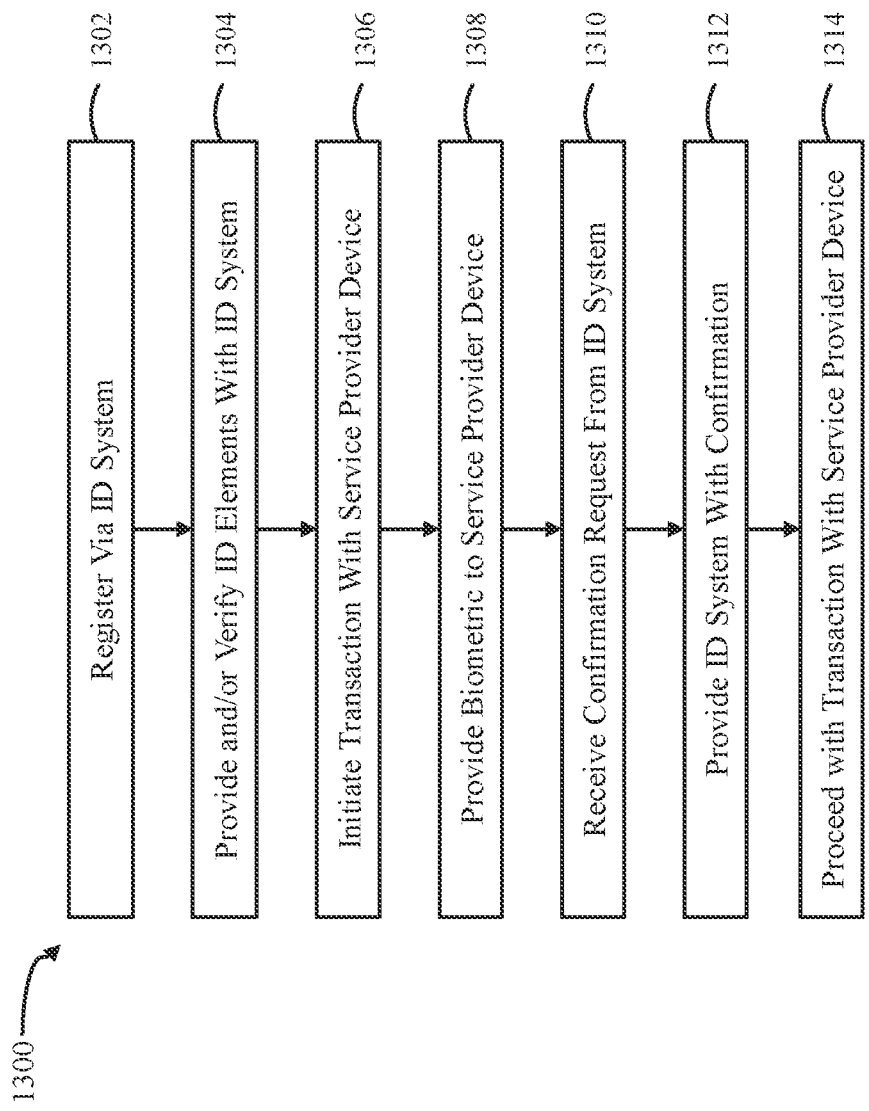
FIG. 13 is a flow diagram of an example process implemented by a user device for registering for an identity service and transacting with service provider devices, according to example embodiments.

FIG. 13 is a flow diagram of an example method 1300 implemented by user device 130, according to example embodiments. At 1302, the user device 130 is used to register with the identity system 110 for an identity service. At 1304, the user device 130 provides and/or verifies identity elements with identity system 110. The identity elements may have been acquired by identity system 110 from via the user device 130 or other sources (e.g., linked accounts, the Internet, etc.). At 1306, the user device 130 is used to initiate or engage in a transaction with the service provider device 150. At 1308, the user device 130 may provide biometric data of the user to the service provider device 150. At 1310, the user device 130 receives a request for confirmation from identity system 110. At 1312, the user device 130 provides confirmation to identity system 110, and at 1314, the user device 130 proceeds with the transaction initiated with the service provider device 150.

Figure 14:
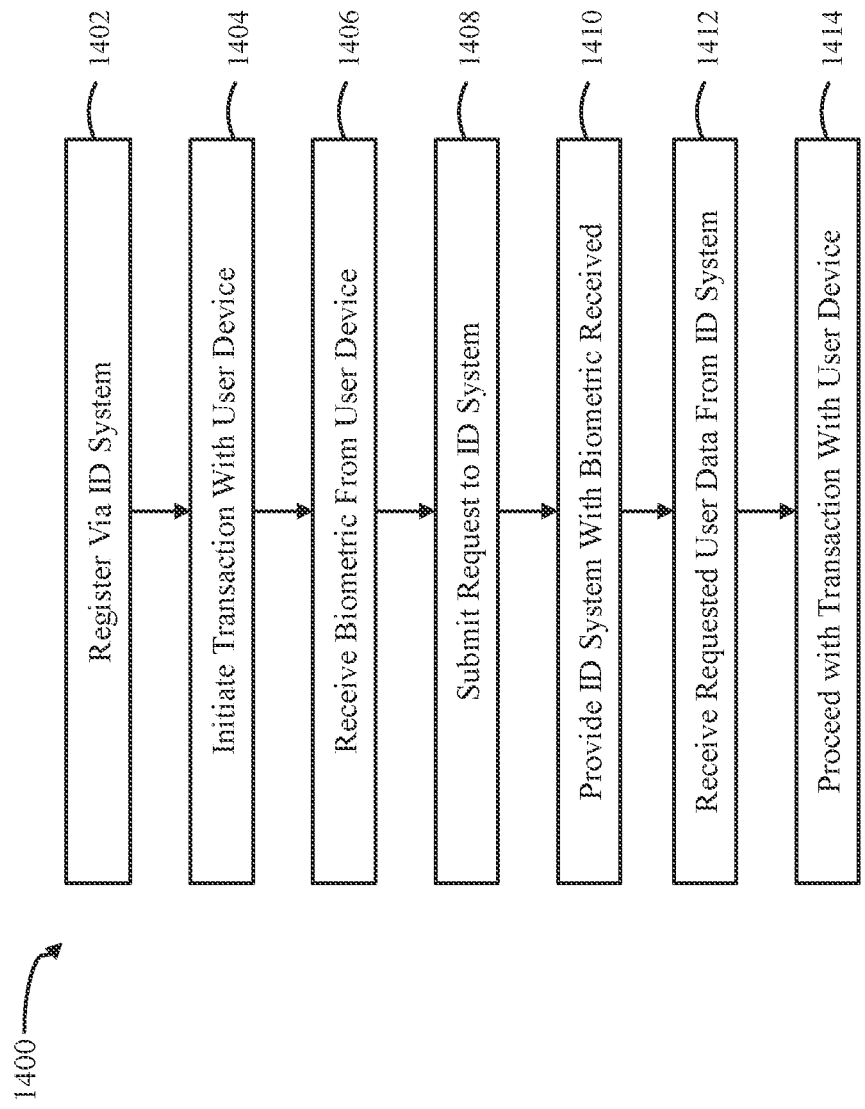
FIG. 14 is a flow diagram of an example process implemented by a service provider device for registering for an identity service and transacting with user devices, according to example embodiments.

FIG. 14 is a flow diagram of an example method 1400 implemented by service provider device 150, according to example embodiments. At 1402, the service provider device 150 is used to register with the identity system 110 for an identity service. At 1404, the service provider device 150 is used to initiate or engage in a transaction with the user device 130. At 1406, the service provider device 150 may receive biometric data of the user from the user device 130. At 1408, the service provider device 150 may submit a request for user data/a password/user authentication to identity system 110. At 1410, the service provider device 150 provides the biometric data received from the user device 130 to identity system 110. At 1412, the service provider device 150 receives the requested user data from the identity system 110. And at 1414, the service provider device 150 proceeds with the transaction initiated with the user device 130.

Figure 15:
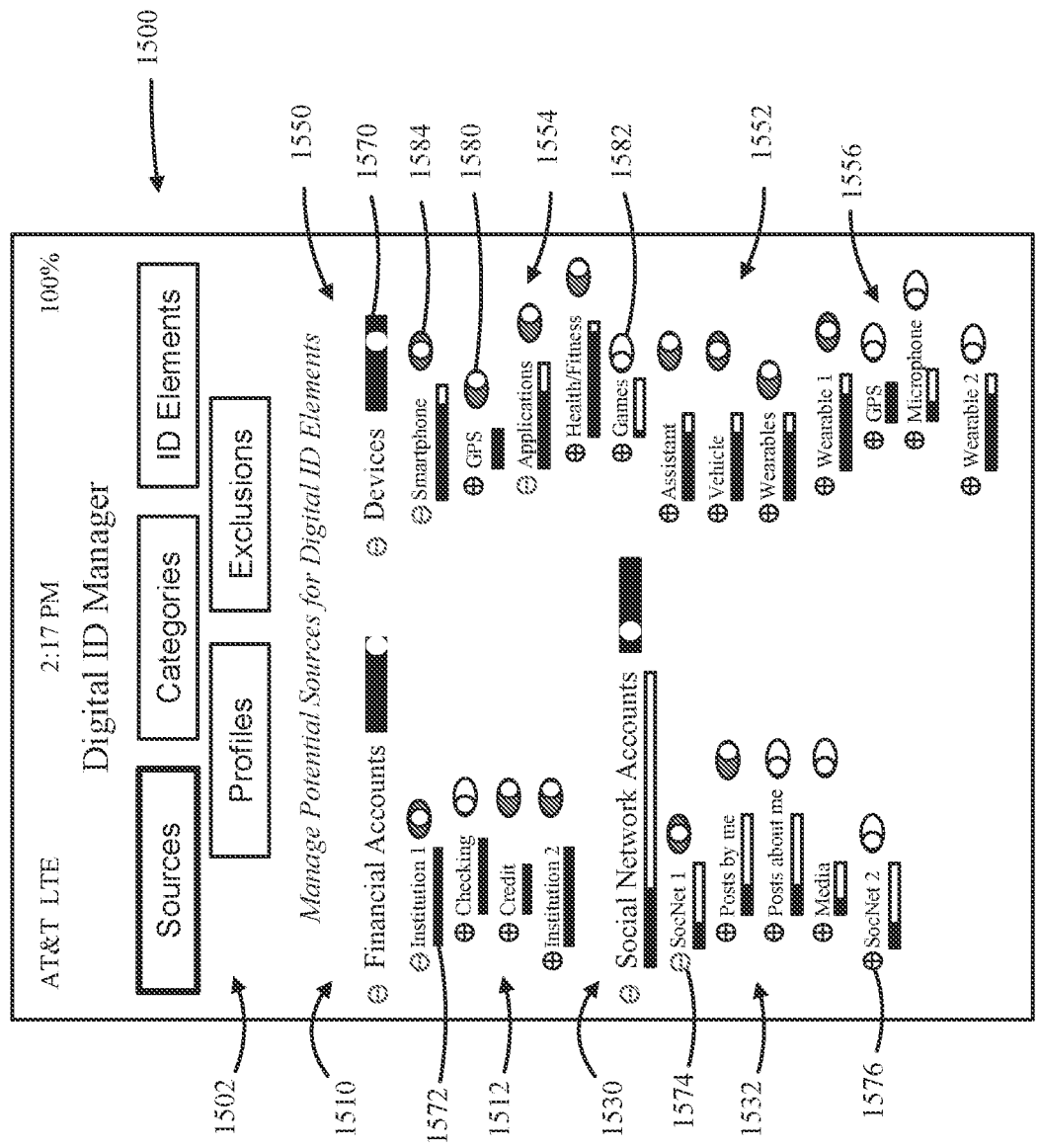
FIG. 15 is an example user interface for managing/controlling digital identity sources via, for example, a website or a client application running on a user device, according to example embodiments.

Referring to FIG. 15, an example user interface 1500 for an example application or web site (e.g., client application 138 titled "Digital ID Manager") is provided, according to example embodiments. The user interface 1500 is shown as a display on a user interface 132 of a user device 130. The user interface 1500 includes various toggles 1502 ("Sources," Categories," "ID Elements," "Profiles," and "Exclusions"). As shown by the bolded outline, "Sources" is selected in FIG. 15. Accordingly, the user interface 1500 is a sources-level user interface. While in the sources-level user interface 1500, the user can view, select (by, e.g., tapping an entry), and/or modify (e.g., by touching and holding and entry, or touching the entry with relatively greater force) sources for identity elements that are acquired/aggregated for identity databank 120/182.

The sources identified in user interface 1500 are financial accounts 1510 at Institution 1 and Institution 2, social network accounts 1530 at Social Network (SocNet) 1 and Social Network 2, and devices 1550, which include a smartphone, a digital assistant, a vehicle, and two wearable devices: wearable 1 and wearable 2 (1552). The types of financial accounts 1510 at Institution 1 are checking and credit accounts (1512). The types of data from SocNet 1 are posts by the user, posts about the user, and media files, such as images, video, and audio (1532). The types of data from the smartphone are GPS data and data from applications running on the smartphone (1554). The types of applications running on the smartphone, from which identity elements may be acquired, include health/fitness applications and games. Similarly, the types of data from wearable 1 include GPS data and data from a microphone of wearable 1 (1556).

Each category (financial accounts, social network accounts, and devices) includes a slider 1570, which may provide a metric (by the relative position of the circle within the rectangle, from left to right) for the category, such as how often sources in the category are accessed/relied upon. For example, if the slider corresponds with reliance on a source, in FIG. 15 data from financial accounts are indicated as being very highly relied upon, data from devices are indicated as being highly relied upon, and data from social network accounts are indicated as being relied upon to a smaller degree. In some implementations, the slider is dynamic, allowing a user to "slide" (move) the position of the position in the rectangle to change the metric. For example, if the slider corresponds with a frequency for how often the sources are "pinged" for data, the user may move the slider to the right to increase frequency (up to a limit of, e.g., once per day, per hour, per minute, etc.), and to the left to decrease frequency (down to a limit of, e.g., once a year, once a month, once a week, or never). User interface 1500 also provides reliability bars 1572 beneath each source or data type, with reliability being directly proportional to the fraction of the bar that is solid black. In FIG. 15, for example, data from Institutions 1 and 2 are deemed highly reliable, while data from games running on the smartphone are indicated as being relatively unreliable.

User interface 1500 provides general toggle switches 1580, 1582, 1584 to allow the user to authorize (activate, enable, turn on, etc.) or de-authorize (deactivate, disable, turn off, etc.) sources, types of data, etc. For example, in FIG. 15, all GPS data from the smartphone is authorized (the toggle 1580 is switched to the right), no data from games running on the smartphone are authorized (the toggle 1582 is switched to the left), and some but not all data from the vehicle are authorized (the toggle 1584 is positioned in the middle).

Figure 16:
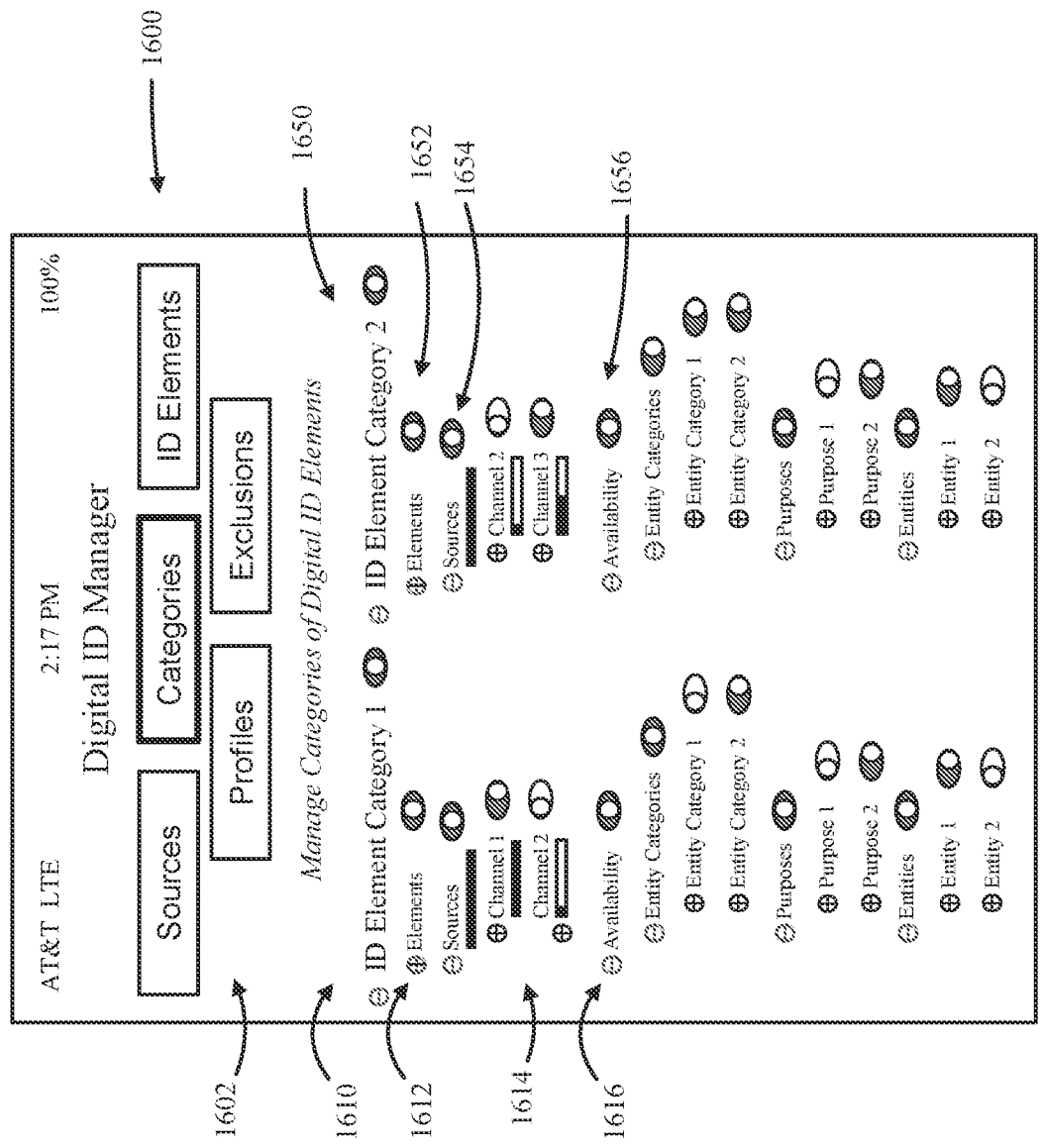
FIG. 16 is an example user interface for managing/controlling digital identity categories via, for example, a website or a client application running on a user device, according to example embodiments.

Referring to FIG. 16, an example user interface 1600 is provided, according to example embodiments. As shown by the bolded outline, "Categories" is selected at toggles 1602 of FIG. 16. Accordingly, the user interface 1600 is a categories-level user interface. While in the categories-level user interface 1500, the user can view, select, and/or modify categories of identity elements that are acquired/aggregated/maintained for identity databank 120/182.

The categories identified in user interface 1600 are ID element category 1 (1610), which includes elements 1612, and ID element category 2 (1650), which includes elements 1652. Under ID element category 1 is a list of sources (1614) from which data in the category may be acquired. The sources labeled channel 1 and channel 2 may be, for example, linked accounts, websites, devices, etc. For identity elements in ID element category 1, availability 1616 indicates the categories of entities to which identity elements may be available/accessible, the purposes for which data elements may be made available/accessible, and the particular entities to which identity elements may be available/accessible. Under ID element category 2 is a list of sources (1654) from which data in the category may be acquired (i.e., channels 2 and 3). For identity elements in ID element category 2, availability 1656 indicates the categories of entities to which identity elements may be available/accessible, the purposes for which data elements may be made available/accessible, and the particular entities to which identity elements may be available/accessible.

Figure 17:
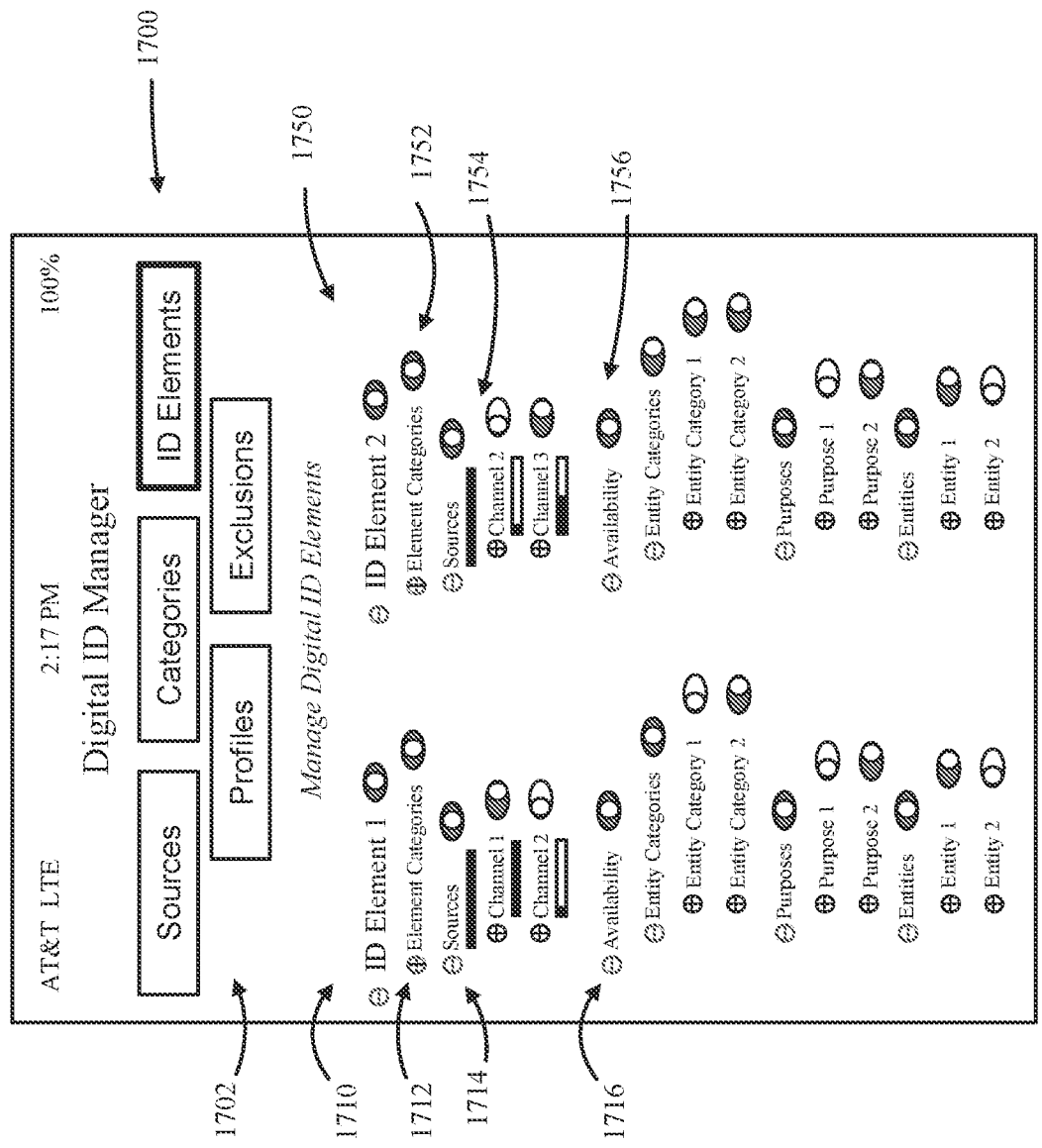
FIG. 17 is an example user interface for managing/controlling digital identity elements via, for example, a website or a client application running on a user device, according to example embodiments.

Referring to FIG. 17, an example user interface 1700 is provided, according to example embodiments. As shown by the bolded outline, "ID Elements" is selected at toggles 1702 of FIG. 17. Accordingly, the user interface 1700 is an ID-elements-level user interface. While in the ID-elements-level user interface 1700, the user can view, select, and/or modify identity elements that are acquired/aggregated/maintained for identity databank 120/182.

The ID elements identified in user interface 1700 are ID element 1 (1710) and ID element 2 (1750). Example identity elements include eye color, biometrics, and geolocations. Under ID element 1 is a list of associated element categories 1712 (e.g., an ID element of eye color and biometrics may be associated with a category of personal data) and sources 1714 from which data in the category may be acquired. The sources labeled channel 1 and channel 2 may be, for example, linked accounts, websites, devices, etc. For identity elements in ID element category 1, availability 1716 indicates the categories of entities to which identity elements may be available/accessible, the purposes for which data elements may be made available/accessible, and the individual entities to which identity elements may be available/accessible. Analogously, under ID element 2 is a list of element categories 1752 and sources 1754 from which data in the category may be acquired (i.e., channels 2 and 3). For ID element 2, availability 1756 indicates the categories of entities to which identity elements may be available/accessible, the purposes for which data elements may be made available/accessible, and the individual entities to which identity elements may be available/accessible.

Figure 18:
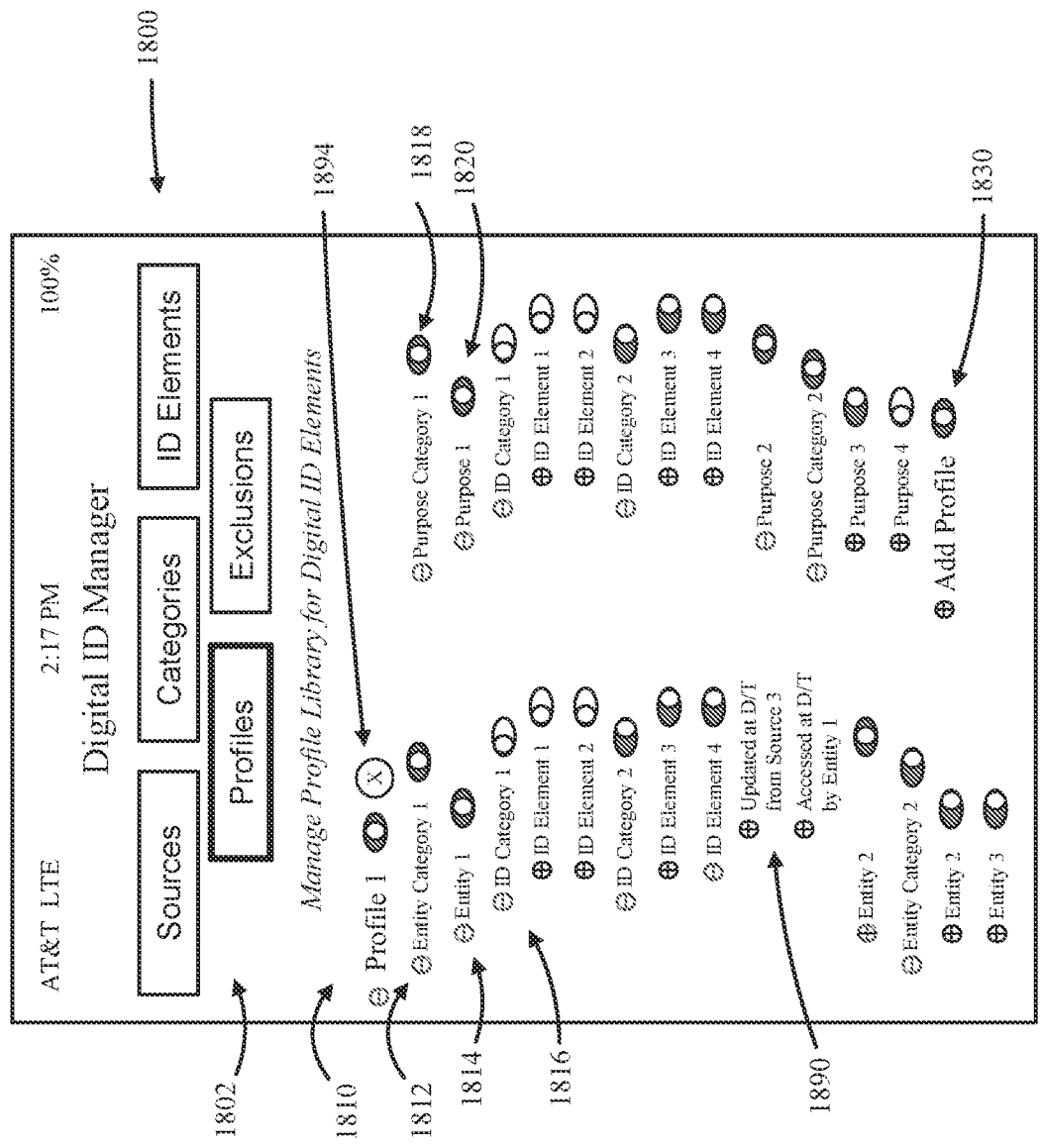
FIG. 18 is an example user interface for managing/controlling digital identity profiles via, for example, a website or a client application running on a user device, according to example embodiments.

Referring to FIG. 18, an example user interface 1800 is provided, according to example embodiments. As shown by the bolded outline, "Profiles" is selected at toggles 1802 of FIG. 18. Accordingly, the user interface 1800 is a profile-level user interface. While in the profile-level user interface 1800, the user can view, select, delete, deactivate, and/or modify access profiles that define how data that are acquired/aggregated/maintained for identity databank 120/182 can be shared by identity system 110.

The profile identified in user interface 1800 is profile 1 (1810). Another profile may be defined by selecting "add profile" (1830), which, when activated, provides a set of items that can be selected, modified from defaults, etc., and/or directs the user to another page/screen for defining a new profile by answering questions, making selections, etc. Under profile 1 is a list of entity categories 1812 (e.g., merchants, government agencies, etc.) that are included in profile 1 as potentially able to access certain user data. For each entity category, a list of entities 1814 in the category may be provided. Additionally or alternatively, identity element categories 1816 (ID category 1 and ID category 2) identifying categories of identity elements accessible to particular entities and/or entity categories is provided. Each identity element category provides a list of corresponding identity elements which may be accessible. Identity elements 1 and 2 fall under ID category 1, and identity elements 3 and 4 fall under ID category 2. User interface 1800 may provide additional details for each element, such as status 1890, which may indicate, for example, the date and/or time (D/T) that corresponding data in the identity element was updated, accessed by an entity, etc. Profile 1 can also be defined by purposes for which accessed data may be accessed/shared by identity system 110. In example user interface 1800, purpose category 1 and purpose category 2 are listed (1818). Example purpose categories may include security, employment, good/services, etc. Under each purpose category are provided individual purposes (1820). Example purposes include security checkpoint at airport, job applications, background checks, purchases at stores and/or restaurants, etc.

Profiles may be deactivated and/or deleted via, for example, a deactivate/delete icon 1894, activation of which by the user may result in a prompt asking the user whether the corresponding profile should be deactivated (e.g., not applied to data/authentication requests but saved for later reactivation) or deleted altogether. In certain implementations, selecting "add profile" (1830) results in a prompt asking the user whether a new profile is to be defined, or an already-defined and saved (such as a deactivated or otherwise inactive) profile should be modified and/or activated for subsequent application to, for example, new requests for data and/or for authentication. A saved profile may have been defined by a user, or be a template profile that can be accepted as-is or modified before being activated. Template profiles may have different purposes or goals, and may include, for example, the most common selections of users overall, or may be based on recommendations for the user based on the particular user's identity databank and how the identity databank has been populated and/or used, or otherwise on anticipated user needs.

Figure 19:
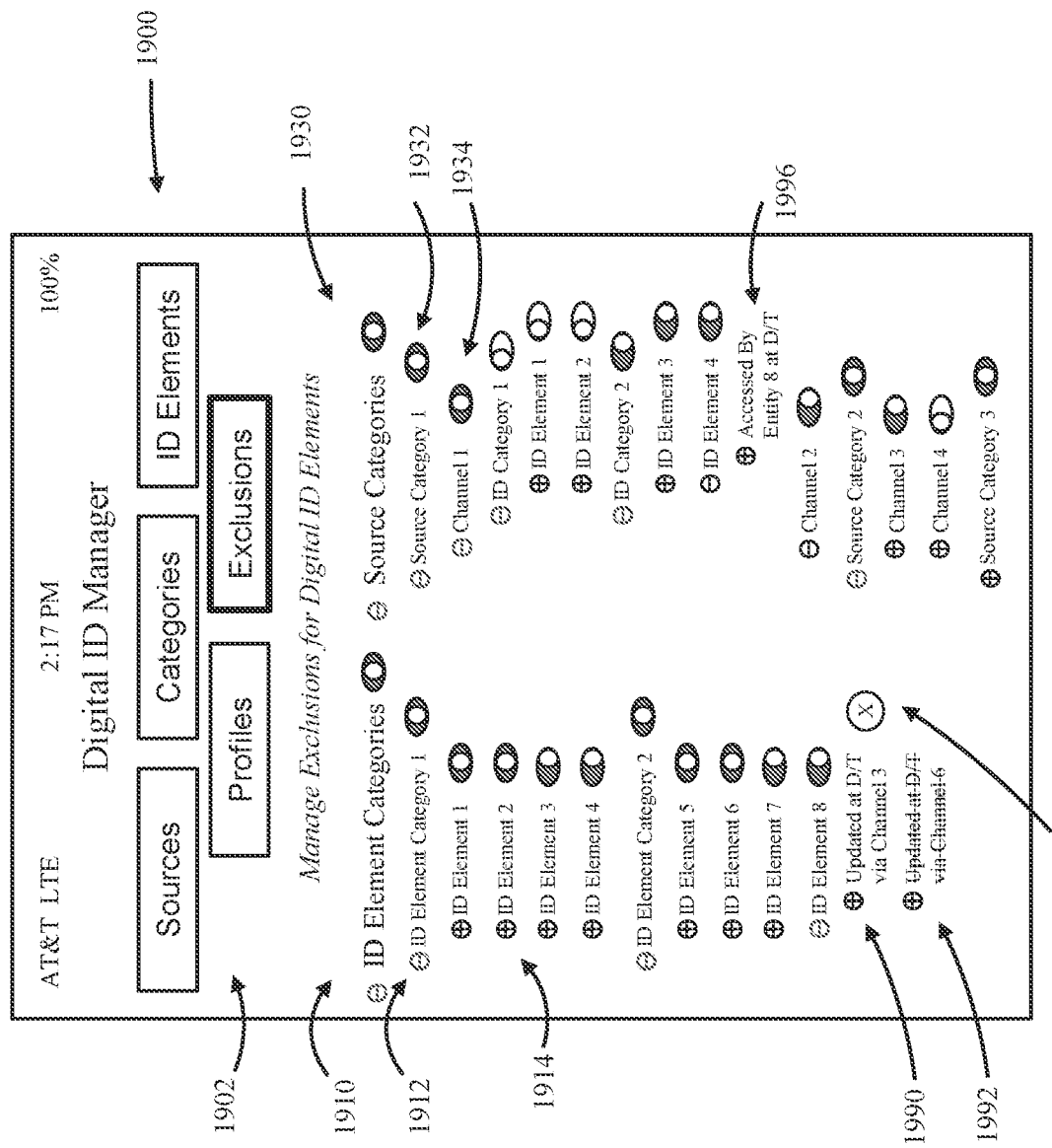
FIG. 19 is an example user interface for managing/controlling digital identity exclusions via, for example, a website or a client application running on a user device, according to example embodiments.

Referring to FIG. 19, an example user interface 1900 is provided, according to example embodiments. As shown by the bolded outline, "Exclusions" is selected at toggles 1902 of FIG. 19. Accordingly, the user interface 1900 is an exclusions-level user interface. While in the exclusions-level user interface 1900, the user can view, select, and/or modify, for example, how certain data is excluded from the user's identity databank, how certain sources are excluded as sources for all data or for certain data, whether certain data already in the identity will be updated, and/or whether an update for certain data received from certain sources or at certain times are removed from the identity databank.

User interface 1900 provides for identity element categories 1910 and source categories 1930. Under identity element categories (1910) are identity element category 1 and identity element category 2 (1912), under each of which may be listed a set of identity elements (1914). ID element 8 (under ID element category 2) provides a first status 1990, indicating when the identity element was updated and through which channel (source). There is an exclusion icon 1994 which, if activated (e.g., by being selected via touch on a touchscreen), may be configured to indicate a desire to have the data acquired in the corresponding update to be excluded from the identity databank. A second status 1992, also indicating when the identity element was updated and via which channel, is crossed out to indicate the user previously activated a corresponding exclusion icon to request the corresponding data to be excluded (if the data is excludable). Under source categories (1930) are source category 1 and source category 2 (1932), under each of which may be listed a set of channels (1934), identity categories, and identity elements. ID element 4 (under identity element category 2), which is under channel 1 and source category 1, provides an access status 1996, indicating when the identity element was accessed by (shared with) an identified entity.

The user interfaces discussed herein and illustrated in the drawings are only intended as non-limiting examples, and fewer or more user interfaces, with fewer or more functionalities, may be provided in various versions. For example, in one of the above user interfaces, or in another user interface, a user is allowed to view where and/or when profiles were used. In certain implementations, this functionality can be provided via an additional top-level menu item (e.g., one called "Reports") on a main screen such as the one depicted in FIGS. 15-19. In some versions, such information is provided when, for example, "Reports" is selected via a toggle (analogous to toggle 1502) to reach a reports-level user interface. In various implementations, a reports-level user interface (or other interface) may allow the user to view a list (report) of various identity-related activities. For example, a user may make a selection (by, e.g., activating a visually-perceptible element, via voice prompt, or otherwise) to view all identity-based transactions (e.g., transactions with service provider devices), to view data used for/in transactions (e.g., identity element(s)), profiles involved (e.g., which profile(s) were applied), times and dates of transactions, locations (e.g., locations of user devices), recipients of data (e.g., service providers), and indications of whether transactions were successful (e.g., whether the user was authenticated or requested data was released by the identity system).

In some versions, the user's identity construct (e.g., the user's identity databank and data about implementation thereof) is owned by, and solely the property of, the user. Accordingly, the user's identity construct may transferrable or otherwise able to be migrated to another appropriate entity (e.g., another identity service provider) at the users' request and authorization. In some implementations, a "copy" of data can be transferred to allow a user to, for example, share certain data for various purposes, such as for research (e.g., for studies on family lineage or for social-behavioral studies).

In certain implementations, the user's identity construct may be monetized. For example, service fees (e.g., monthly, annually, or one-time fees) may be charged by the identity service provider for maintaining the user's identity databank. In some implementations, the user (i.e., the identity construct owner) may be permitted to monetize elements of his or her identity. For example, for certain compensation or services, such as for providing targeted advertisements, a user may allow another entity to access certain data concerning the user and his or her transactions. The user may, in effect, license elements of his or her identity at his or her sole discretion. For example, the owner may license use of his or her email or physical address data to specific search engines, soliciting agencies, etc.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U. S. C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for providing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method comprising:
   acquiring, by an identity system, user data related to a user;
   generating, from the user data related to the user, a set of one or more identity elements in an identity databank, each identity element in the set of one or more identity elements having one or more payload values;
   determining, based on the one or more payload values, for each identity element in the set of one or more identity elements:
   (1) metadata related to the identity element; and
   (2) at least one of a first identifier of each identity element or a second identifier of a source of each identity element;
   receiving, via a graphical interface, instructions for control of the identity databank, the graphical interface being configured to allow the user to control:
   entities that may access values in identity elements of the identity databank; and
   purposes for which identified values in the identity elements may be shared; and
   receiving, in a transmission initiated by a service provider device, a request for at least one of user data or authentication.

2. The method of claim 1, wherein the graphical interface is further configured to allow the user to control sources for the user data acquired by the identity system.

3. The method of claim 1, wherein each of the one or more payload values corresponds to a category of the user data, and wherein at least one of the metadata, the first identifier, or the second identifier is determined based on the category corresponding to each of the one or more payload values.

4. The method of claim 1, wherein the graphical interface is presented by a client application running on a user device of the user.

5. The method of claim 4, wherein the method is implemented by a central identity system, and wherein the client application running on the user device is received by the user device via the central identity system.

6. The method of claim 1, wherein the graphical interface is further configured to allow the user to define a first access profile and a second access profile, each of the first access profile and the second access profile being part of a contextual identity profile library.

7. The method of claim 6,
   wherein defining the first access profile comprises identifying a first set of one or more identity elements or categories thereof, and a first set of one or more entities or categories thereof, and
   wherein defining the second access profile comprises identifying a second set of one or more identity elements or categories thereof, and a second set of one or more entities or categories thereof.

8. The method of claim 7, further comprising granting one or more entities identified in the first access profile and the second access profile access to one of more corresponding identity elements identified in the first access profile and the second access profile, respectively.

9. The method of claim 1, further comprising validating the request via a second transmission to the user device.

10. The method of claim 1, wherein the metadata corresponding to each identity element comprises at least one of one or more dates or one or more locations related to the identity element.

11. The method of claim 1, further comprising retrieving requested user data from the identity databank, and transmitting the retrieved data to the service provider device.

12. The method of claim 1, further comprising generating a password for the user, and adding the password to the identity databank.

13. The method of claim 12, further comprising linking the password to at least one of a user account administered by the service provider device or a service provider associated with the service provider device.

14. The method of claim 12, wherein the request is a request for the password, and wherein the method further comprises transmitting the password to the service provider device.

15. A system comprising one or more processors and a memory configured to:
   acquire user data related to a user;
   generate, from the user data related to the user, a set of one or more identity elements in an identity databank, each identity element in the set of one or more identity elements having one or more payload values each of the one or more payload values corresponding to a category of the user data;
   determining, based on the one or more payload values, for each identity element in the set of one or more identity elements:
   (1) metadata corresponding to the identity element; and
   (2) at least one of a first identifier of each identity element or a second identifier of a source of each identity element;
   receive, via a graphical interface, instructions for control of the identity databank, the graphical interface being configured to allow the user to control:

entities that may access values in identity elements of the identity databank; and purposes for which identified values in the identity elements may be shared; and receive, in a transmission initiated by a service provider device, a request for at least one of user data or authentication.

16. The system of claim 15, wherein the graphical interface is further configured to allow the user to control sources for the user data acquired by the identity system.

17. The system of claim 15, wherein each of the one or more payload values corresponds to a category of the user data, and wherein at least one of the metadata, the first identifier, or the second identifier is determined based on the category corresponding to each of the one or more payload values.

18. The system of claim 15, wherein:

the graphical interface is further configured to allow the user to define a first access profile and a second access profile, each of the first access profile and the second access profile being part of a contextual identity profile library, wherein defining the first access profile comprises identifying a first set of one or more identity elements or categories thereof, and a first set of one or more entities or categories thereof, and wherein defining the second access profile comprises identifying a second set of one or more identity elements or categories thereof, and a second set of one or more entities or categories thereof; and the one or more processors are further configured to grant one or more entities identified in the first access profile and the second access profile access to one of more corresponding identity elements identified in the first access profile and the second access profile, respectively.

19. A user device comprising:

a network interface configured to communicate via a telecommunications network;

one or more user interfaces for receiving inputs from and providing outputs to a user; and one or more processors and a memory configured to:

accept a first input, via the one or more user interfaces, requesting registration for an identity service administered by a central identity system;

transmit to the central identity system, via the network interface, an indication that the identity service has been requested, wherein the registration causes the central identity system to:

generate, from user data related to the user, a set of one or more identity elements in an identity databank, each identity element in the set of one or more identity elements having one or more payload values; and determine, based on the one or more payload values, for each identity element in the set of one or more identity elements:

(1) metadata related to the identity element; and (2) at least one of a first identifier of each identity element or a second identifier of a source of each identity element; and present, via the one or more user interfaces, a graphical interface, the graphical interface being configured to allow the user to control:

entities that may access, via the central identity system, values in identity elements of the identity databank; and purposes for which identified values in the identity elements may be shared by the central identity system; and receive, in a transmission initiated by a service provider device a request for at least one of user data and authentication.

20. The user device of claim 19, wherein the user device further comprises a biometric sensor, and wherein the one or more processors are further configured to:

initiate, via the network interface, a transaction with a service provider device;

detect a biometric using the biometric sensor;

receive, from the central identity system, a request for confirmation that the transaction was initiated via the user device;

transmit, via the network interface, confirmation of the transaction to the central identity system; and proceed with the transaction with the service provider device.

* * * * *